(12) United States Patent
Lim et al.

(10) Patent No.: US 11,792,397 B2
(45) Date of Patent: Oct. 17, 2023

(54) APPARATUS AND METHOD FOR VIDEO ENCODING OR DECODING SUPPORTING VARIOUS BLOCK SIZES

(71) Applicant: SK TELECOM CO., LTD., Seoul (KR)

(72) Inventors: Jeong-yeon Lim, Seoul (KR); Sun-young Lee, Seoul (KR); Hyeong-duck Kim, Suwon-si (KR); Hyo Song Kim, Seoul (KR); Se-hoon Son, Seoul (KR); Jae-seob Shin, Seoul (KR); Gyeong-taek Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 17/944,707

(22) Filed: Sep. 14, 2022

(65) Prior Publication Data
US 2023/0016264 A1  Jan. 19, 2023

Related U.S. Application Data

(63) Continuation of application No. 17/365,079, filed on Jul. 1, 2021, which is a continuation of application
(Continued)

(30) Foreign Application Priority Data

May 26, 2017 (KR) .......................... 10-2017-0065495
Jul. 31, 2017 (KR) .......................... 10-2017-0097259

(51) Int. Cl.
*H04N 11/02* (2006.01)
*H04N 19/119* (2014.01)
(Continued)

(52) U.S. Cl.
CPC ......... *H04N 19/119* (2014.11); *H04N 19/136* (2014.11); *H04N 19/176* (2014.11); *H04N 19/96* (2014.11)

(58) Field of Classification Search
CPC .................................................. H04N 19/119
(Continued)

(56) References Cited

U.S. PATENT DOCUMENTS 9,848,197 B2  12/2017  Chen et al.
10,567,761 B2  2/2020  Bordes et al.
(Continued)

FOREIGN PATENT DOCUMENTS

CN   102907100 A   1/2013
CN   104702974 A   6/2015
(Continued)

OTHER PUBLICATIONS

Office Action dated Feb. 11, 2023, for corresponding Chinese patent application No. 201880036548.8, along with an English translation (21 pages).
(Continued)

*Primary Examiner* — Leron Beck
(74) *Attorney, Agent, or Firm* — Hauptman Ham, LLP

(57) ABSTRACT

Disclosed herein is video encoding or decoding for efficiently encoding video. The techniques of the present disclosure are related to various split shapes of a block, syntaxes representing various split types of blocks, and syntax elements represented at a high level therefor.

13 Claims, 14 Drawing Sheets

Related U.S. Application Data

No. 16/617,250, filed as application No. PCT/KR2018/005879 on May 24, 2018, now Pat. No. 11,218,697.

(51) Int. Cl.
  *H04N 19/136* (2014.01)
  *H04N 19/176* (2014.01)
  *H04N 19/96* (2014.01)

(58) Field of Classification Search
  USPC ..................................... 375/240.01–240.29
  See application file for complete search history.

(56) References Cited

U.S. PATENT DOCUMENTS

| | | |
|---|---|---|
| 2013/0016769 A1 | 1/2013 | Chen et al. |
| 2013/0064292 A1 | 3/2013 | Song et al. |
| 2013/0089152 A1 | 4/2013 | Wang et al. |
| 2013/0182755 A1 | 7/2013 | Chen et al. |
| 2013/0294524 A1 | 11/2013 | Van Der Auwera et al. |
| 2014/0086311 A1 | 3/2014 | Lou et al. |
| 2015/0189269 A1 | 7/2015 | Han et al. |
| 2017/0118486 A1 | 4/2017 | Rusanovskyy |
| 2017/0208336 A1 | 7/2017 | Li et al. |
| 2017/0272745 A1 | 9/2017 | Liu et al. |
| 2017/0280162 A1 | 9/2017 | Zhao et al. |
| 2017/0347096 A1 | 11/2017 | Hong et al. |
| 2017/0347128 A1 | 11/2017 | Panusopone et al. |

FOREIGN PATENT DOCUMENTS

| | | |
|---|---|---|
| KR | 10-1635830 B1 | 7/2016 |
| KR | 10-2016-0104706 A | 9/2016 |
| KR | 10-2017-0002460 A | 1/2017 |
| KR | 10-1718969 B1 | 3/2017 |
| WO | 2016-091161 A1 | 6/2016 |
| WO | 2017-008678 A1 | 1/2017 |

OTHER PUBLICATIONS

International Search Report dated Aug. 27, 2018 for corresponding international application No. PCT/KR2018/005879.
Indian Office Action dated Mar. 18, 2021, in connection with the Indian Patent Application No. 201927052428.
Chen J., et al. "Algorithm Description of Joint Exploration Test Model 1," 1, JVET Meeting, Oct. 19-21, 2015.
Xiang Li et al., "Multi-Type-Tree", Joint Video Exploration Team (JVET) of ITU-T SG 16 WP 3 and ISO/IEC JTC 1/SC 29/WG 11, 4th Meeting, Chengdu, CN, Oct. 15-21, 2016, 3 pages.
Jianle Chen et al., "Algorithm Description of Joint Exploration Test Model 2", Joint Video Exploration Team (JVET) of ITU-T SG 16 WP 3 and ISO/IEC JTC 1/SC 29/WG 11, 2nd Meeting, San Diego, USA, Feb. 20-26, 2016, 31 pages.
"High efficiency video coding", ITU-T (Telecommunication Standardization Sector of ITU) H.265, Apr. 2013, 317 pages.
Korean Office Action dated Mar. 23, 2022, in connection with the Korean Patent Application No. 10-2017-0097259.

(1) 1/2  (2) 1/4  (3) 3/4  (4) tri (1/4 & 3/4)

(a) Block splitting in vertical direction (1) 1/2  (2) 1/4  (3) 3/4  (4) tri (1/4 & 3/4)

(b) Block splitting in horizontal direction (a)

(b)

(a) Splitting into three regions  (b) Splitting into two regions

APPARATUS AND METHOD FOR VIDEO ENCODING OR DECODING SUPPORTING VARIOUS BLOCK SIZES

CROSS-REFERENCE TO RELATED APPLICATION

This application is a continuation of U.S. patent application Ser. No. 17/365,079, filed on Jul. 1, 2021, which is a continuation of U.S. patent application Ser. No. 16/617,250, filed on Nov. 26, 2019 which is a national stage filing under 35 U.S.C § 371 of International Application No. PCT/KR2018/005879 filed on May 24, 2018 which is based upon and claims the benefit of priorities to Korean Patent Application No. 10-2017-0065495, filed on May 26, 2017 and Korean Patent Application No. 10-2017-0097259, filed on Jul. 31, 2017, in the Korean Intellectual Property Office, which are incorporated herein in their entireties by reference.

TECHNICAL FIELD

The present disclosure relates to video encoding or decoding for efficiently encoding video. More specifically, the present disclosure relates to techniques for signaling partitioning information regarding Quadtree plus Binary tree (QTBT)-based block partitioning.

BACKGROUND

The statements in this section merely provide background information related to the present disclosure and may not constitute prior art.

In High Efficiency Video Coding (HEVC), a coding tree unit (CTU) is a coding tree for reflecting various local characteristics in video and is divided into coding units (CUs) using a QuadTree scheme. When the CU is determined in this way, intra-coding prediction and inter-coding prediction are performed on the CU basis. Each CU is again divided into prediction units (PUs). After the PUs are determined and the prediction process is performed, the CU is divided into transformation units (TUs) for the residual block.

FIG. 1 is a diagram illustrating an example in which a CTU is split by a QuadTree scheme and a tree structure representing the splitting. One large block CTU is split into four equal squares, wherein the divided above left block and the above right blocks are not split anymore, while each of the bottom left and right blocks is split again into four equal squares. In (b) of FIG. 1, a circle, which represents a block, is referred to as a "node," and a final node which is referred to as a "leaf node" that is not split anymore is colored in gray. That is, all leaf nodes refer to a CU, which is a final coding block.

As a high-level syntax for expressing the CTU and the CU mentioned above, two syntax elements are specified in a sequence parameter set (SPS) as shown in Table 1.

TABLE 1

|  | Descriptor |
| --- | --- |
| seq_parameter_set_rbsp( ) { |  |
| ... |  |
| log2_min_luma_coding_block_size_minus3 | ue(v) |
| log2_diff_max_min_luma_coding_block_size | ue(v) |
| ... |  |

Here, log2_min_luma_coding_block_size_minus3 specifies the minimum CU block size (min_luma_coding_block_size) allowed on the luma block basis, and log2_diff_max_min_luma_coding_block_size specifies a difference between min_luma_coding_block_size and the maximum CU block size (max_luma_coding_block_size) allowed on the luma block basis. Using the two syntax elements, the actual minimum luma block size (MinCbSizeY) is represented as Equation 3, and the CTU size (CtbSizeY) is represented as Equation 4.

$$MinCbLog2SizeY = log2\_min\_luma\_coding\_block\_size\_minus3 + 3 \quad (1)$$

$$CtbLog2SizeY = MinCbLog2SizeY + log2\_diff\_max\_min\_luma\_coding\_block\_size \quad (2)$$

$$MinCbSizeY = 1 << MinCbLog2SizeY \quad (3)$$

$$CtbSizeY = 1 << CtbLog2SizeY \quad (4)$$

Splitting information about a plurality of CU blocks in a CTU is recorded in a coding quadtree header part of a slice header, as shown in Table 2. A 1-bit flag split_cu_flag is used to indicate whether quad tree splitting has been applied to a given node. When the flag is "0," it indicates that splitting is not performed. When the flag is "1," it indicates that a unit is split into four equal units. As the flag is repeatedly used, the size and location information about the split CU blocks in the CTU is presented.

TABLE 2

|  | Descriptor |
| --- | --- |
| coding_quadtree( x0, y0, log2CbSize, cqtDepth ) { |  |
| ... |  |
| split_cu_flag[ x0 ][ y0 ] | ae(v) |
| ... |  |

Recently, a Quadtree plus Binary tree (QTBT) structure has been newly discussed. The QTBT structure eliminates the conventional concepts of CU, PU, and TU while providing flexibility in CU partitioning in order to match various local features of video data. That is, in QTBT, a CU may be defined to have a square or rectangular shape. In addition, while the CTU size is 64 in HEVC, the necessity of larger block sizes such as 128 and 256 has been discussed as video resolution increases. Thus, when a block is split into at least 4×4 blocks in the CTU, the amount of data required to signal the splitting information increases.

SUMMARY

Technical Problem

It is an object of the present disclosure to efficiently signal splitting information related to Quadtree plus Binary tree (QTBT)-based block partitioning.

Technical Solution

In accordance with one aspect of the present disclosure, provided is a method for decoding video data, including receiving a bitstream containing encoded data for a block of video data; parsing syntax elements for block partitioning defined at a high level by decoding header information of the high level, the block of the video data belonging to the high level; calculating parameters for block partitioning from the syntax elements; deriving a QTBT block partitioning structure for the block of the video data from the bitstream based on the calculated parameters, wherein the QTBT block partitioning structure is a structure having the BT rooted from a leaf node of the QT; and decoding final subblocks corresponding to leaf nodes of QTBT based on the video bitstream.

In accordance with another aspect of the present invention, provided is a method for decoding video data, including receiving a bitstream containing encoded data for a block of video data; parsing syntax elements for block partitioning defined at a high level by decoding header information of the high level, the block of the video data belonging to the high level; calculating parameters for block partitioning from the syntax elements; deriving a QTBT block partitioning structure for the block of the video data from the bitstream based on the calculated parameters, wherein the QTBT block partitioning structure is a structure having the BT rooted from a leaf node of the QT; and decoding final subblocks corresponding to leaf nodes of QTBT based on the video bitstream.

In some embodiments, the parameters for block partitioning include a first parameter indicating a minimum block size of a leaf node allowed in a BT, a second parameter indicating a minimum block size of a leaf node allowed in a QT, a third parameter indicating a maximum block size of a root node allowed in the BT, and a fourth parameter indicating a size of the block of the video data.

In some other embodiments, the parameters for block partitioning include a first parameter indicating a minimum block size of a BT leaf node of a generated through symmetric spitting, a second parameter indicating a minimum block size of a BT leaf node generated through asymmetric spitting, a third parameter indicating a minimum block size of a leaf node allowed in a QT, a fourth parameter indicating a maximum block size of a root node allowed in a BT, and a fifth parameter indicating a size of the block of the video data.

DETAILED DESCRIPTION

Figure 1:
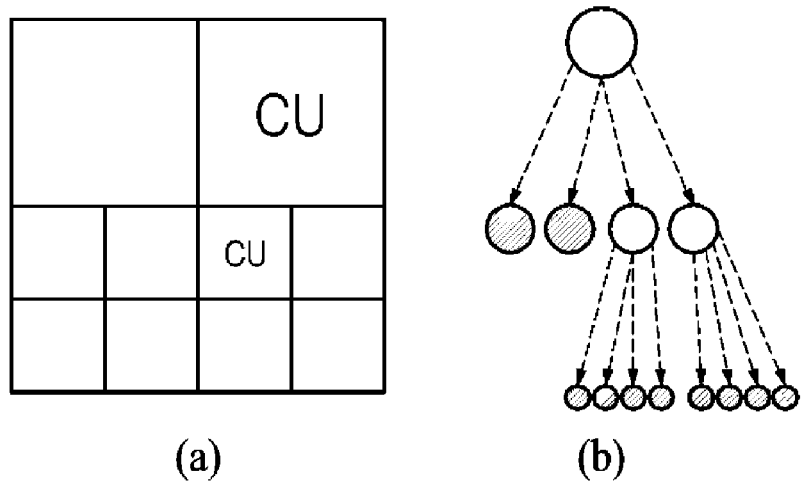
FIG. 1 is a diagram illustrating an example in which a CTU is split by a QuadTree scheme and a tree structure representing the splitting.

Hereinafter, some embodiments of the present disclosure will be described in detail with reference to the accompanying drawings. It should be noted that, in adding reference numerals to the constituent elements in the respective drawings, like reference numerals designate like elements, although the elements are shown in different drawings. Further, in the following description of the present disclosure, a detailed description of known functions and configurations incorporated herein will be omitted when it may make the subject matter of the present disclosure rather unclear.

The techniques described below may be used in a video signal processing apparatus configured to encode and/or decode a video signal. In general, a video signal refers to an image signal or a sequence of pictures that are recognizable to the eye. However, in this specification, the term "video signal" may be used to refer to a sequence of bits representing a coded picture or a bitstream corresponding to the bit sequence. A picture may refer to an arrangement of samples, and may be referred to as a frame, an image, or the like. More specifically, a picture may refer to a two-dimensional array of samples or a two-dimensional sample array. A sample may refer to a minimum unit constituting a picture, and may be referred to as a pixel, a picture element, a pel, or the like. A sample may include a luminance component (luma) and/or a chrominance component (chroma). In this specification, coding may be used to refer to encoding, or may collectively refer to encoding/decoding.

A picture may include at least one slice, and a slice may include at least one block. A slice may be configured to include an integer number of blocks for the purpose of parallel processing or the like, or for the purpose of resynchronization of decoding when a bitstream is destroyed due to data loss or the like, and each slice may be independently coded. A block may include at least one sample and may refer to an arrangement of samples. A block may have a size smaller than or equal to that of a picture. A block may be referred to as a unit. A picture that is currently coded may be referred to as a current picture, and a block that is currently coded may be referred to as a current block.

A coding tree unit (CTU) or coding tree block (CTB) refers to the most basic unit constituting a picture, and may be split into coding blocks in a quad-tree form to increase coding efficiency according to the texture of a picture. A coding block (CB) or a coding unit (CU) may refer to a basic unit in which coding is performed, and intra-coding or inter-coding may be performed on a CB basis. Intra-coding may refer to performing coding using intra-prediction, and intra-prediction may refer to performing prediction using samples included in the same picture or slice. Inter-coding may refer to performing coding using inter-prediction, and inter-prediction may refer to performing prediction using samples included in a picture different from the current picture. A block coded using intra-coding or a block coded in an intra-prediction mode may be referred to as an intra-block, and a block coded using inter-coding or a block coded in an inter-prediction mode may be referred to as an inter-block. In addition, a coding mode using intra-prediction may be referred to as an intra-mode, and a coding mode using inter-prediction may be referred to as an inter-mode.

The techniques of the present disclosure are related to various split shapes of a block, syntaxes representing various split types of blocks, and syntax elements represented at a high level therefor.

Figure 2:
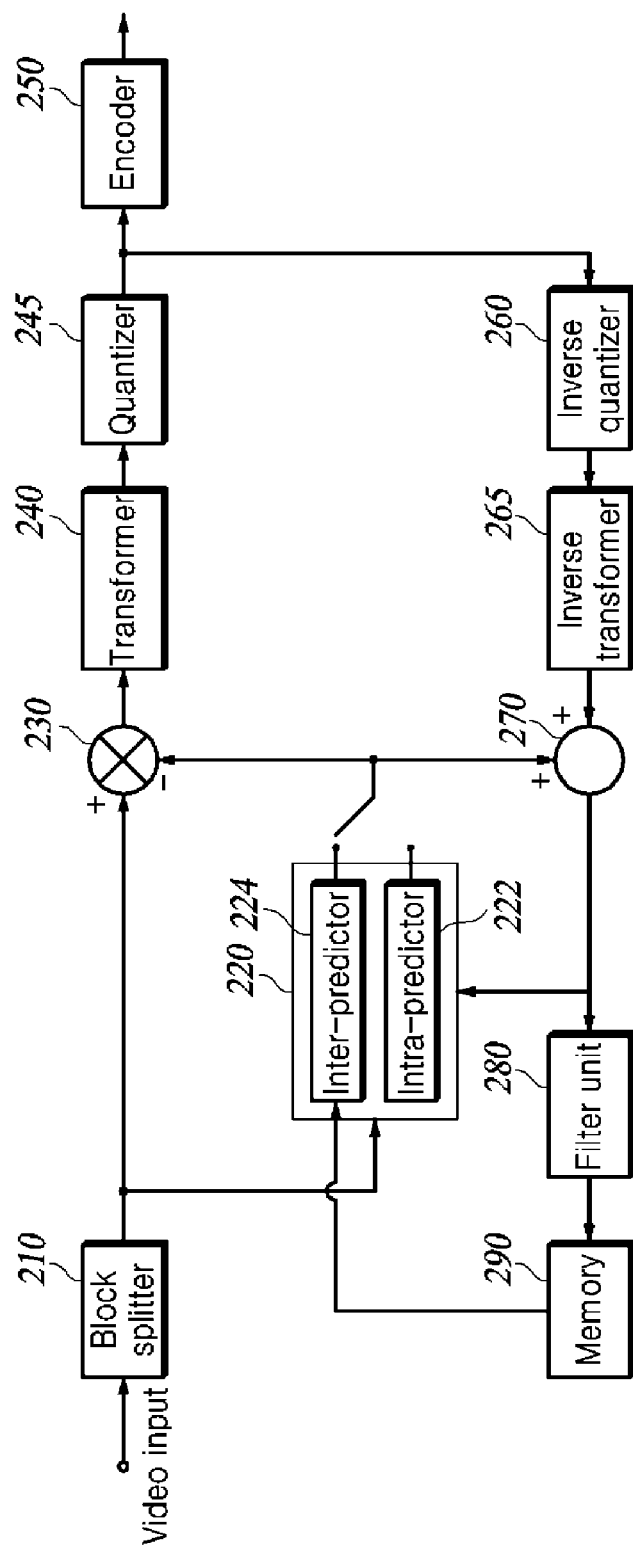
FIG. 2 is an exemplary block diagram of a video encoding apparatus capable of implementing techniques of the present disclosure.

FIG. 2 is an exemplary block diagram of a video encoding apparatus capable of implementing techniques of the present disclosure.

The video encoding apparatus includes a block splitter 210, a predictor 220, a subtractor 230, a transformer 240, a quantizer 245, an encoder 250, an inverse quantizer 260, an inverse transformer 265, an adder 270, a filter unit 280, and a memory 290. Each element of the video encoding apparatus may be implemented as a hardware chip, or may be implemented as software, and the microprocessor may be implemented to execute the functions of the software corresponding to the respective elements.

The block splitter 210 splits each picture constituting video into a plurality of coding tree units (CTUs), and then recursively splits the CTUs using a tree structure. A leaf node in the tree structure is a coding unit (CU), which is a basic unit of coding. A QuadTree (QT) structure, in which a node (or a parent node) is split into four sub-nodes (or child nodes) of the same size, or a QuadTree plus BinaryTree (QTBT) structure combining the QT structure and a BinaryTree (BT) structure, in which a node is split into two sub-nodes, may be used as the tree structure.

Figure 3:
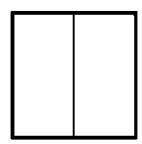
FIG. 3 is a diagram illustrating BT split types proposed in the present disclosure.
Figure 3:
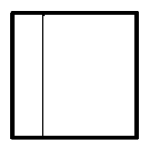
Figure 3:
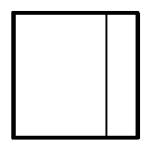
Figure 3:
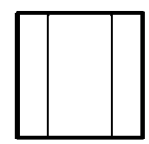
Figure 3:
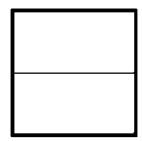
Figure 3:
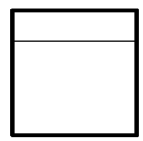
Figure 3:
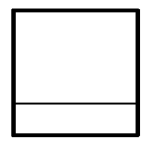
Figure 3:
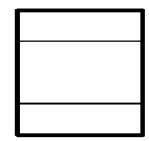

In the QuadTree plus BinaryTree (QTBT) structure, a CTU can be first split according to the QT structure. The quadtree splitting may be repeated until the size of the splitting block reaches the minimum block size MinQTSize of the leaf node allowed in QT. If the leaf node of the QT is not greater than the maximum block size MaxBTSize of the root node allowed in the BT, it may be further partitioned into a BT structure. The BT may have a plurality of split types. FIG. 3 is a diagram illustrating BT split types proposed in the present disclosure. For example, in some examples, there may be two splitting types, which are a type of horizontally splitting a given block into two blocks of the same size (i.e., symmetric horizontal splitting) and a type of vertically splitting a given block into two blocks of the same size (i.e., symmetric vertical splitting) (indicated by ½ in FIG. 3). Further, there may be splitting types of splitting a given block into two asymmetric blocks. The asymmetric splitting may include splitting a given block into two rectangular blocks at a size ratio of 1:3 (indicated by ¼ in FIG. 3), splitting a given block into two rectangular blocks at a size ratio of 3:1 (indicated by ¾ in FIG. 3), or splitting a given block into three rectangular blocks at a size ratio of 1:2:1 (indicated by tri(¼ & ¾) in FIG. 3). It may further include smaller asymmetric splitting at a ratio (e.g., 1:7, 7:1, etc.) other than 1:3 and 3:1.

The splitting information generated by the block splitter 210 by splitting the CTU by the QTBT structure is encoded by the encoder 250 and transmitted to the video decoding apparatus.

Hereinafter, a block corresponding to a CU (i.e., a leaf node of the QTBT) to be encoded or decoded is referred to as a "current block."

The predictor 220 generates a prediction block by predicting a current block. The predictor 220 includes an intra-predictor 222 and an inter-predictor 224.

The intra-predictor 222 predicts pixels in the current block using pixels (reference pixels) located around the current block in the current picture in which the current block is included. There is a plurality of intra-prediction modes according to the prediction directions, and the peripheral pixels and the equation to be used are defined differently according to each prediction mode. In particular, the intra-predictor 222 may determine an intra-prediction mode to be used in encoding the current block. In some examples, the intra-predictor 222 may encode the current block using several intra-prediction modes and select an appropriate intra-prediction mode to use from the tested modes. For example, the intra-predictor 222 may calculate rate distortion values using rate-distortion analysis of several tested intra-prediction modes, and may select an intra-prediction mode that has the best rate distortion characteristics among the tested modes.

The inter-predictor 224 searches for a block most similar to the current block in a reference picture encoded and decoded earlier than the current picture, and generates a prediction block for the current block using the searched block. Then, the inter-predictor generates a motion vector corresponding to a displacement between the current block in the current picture and the prediction block in the reference picture. The motion information including the information about the reference picture and a motion vector used to predict the current block is encoded by the encoder 250 and transmitted to the video decoding apparatus.

The subtractor 230 subtracts the prediction block generated by the intra-predictor 222 or the inter-predictor 224 from the current block to generate a residual block.

The transformer 240 transforms residual signals in the residual block having pixel values in the spatial domain into transform coefficients in the frequency domain. The transformer 240 may transform the residual signals in the residual block by using the size of the current block as a transform unit, or may split the residual block into a plurality of smaller subblocks and transform residual signals in transform units corresponding to the sizes of the subblocks. There may be various methods of splitting the residual block into smaller subblocks. For example, the residual block may be split into subblocks of the same predefined size, or may be split in a manner of a quadtree (QT) which takes the residual block as a root node.

The quantizer 245 quantizes the transform coefficients output from the transformer 240 and outputs the quantized transform coefficients to the encoder 250.

The encoder 250 encodes the quantized transform coefficients using a coding scheme such as CABAC to generate a bitstream. The encoder 250 encodes information such as block spitting-related parameters (MinBtSizeY, SymMinBtSizeY, AsymMinBtSizeY, MinQtSizeY, MaxBtSizeY, CtbSizeY), a QT split flag, and a BT split flag, which are associated with the block split, such that the video decoding apparatus splits the block in the same manner as in the video encoding apparatus.

The encoder 250 encodes information about a prediction type indicating whether the current block is encoded by intra-prediction or inter-prediction, and encodes intra-prediction information or inter-prediction information according to the prediction type.

The inverse quantizer 260 inversely quantizes the quantized transform coefficients output from the quantizer 245 to generate transform coefficients. The inverse transformer 265 transforms the transform coefficients output from the inverse quantizer 260 from the frequency domain to the spatial domain and reconstructs the residual block.

The adder 270 adds the reconstructed residual block to the prediction block generated by the predictor 220 to reconstruct the current block. The pixels in the reconstructed current block are used as reference samples in performing intra-prediction of the next block in order.

The filter unit 280 deblock-filters the boundaries between the reconstructed blocks in order to remove blocking artifacts caused by block-by-block encoding/decoding and stores the blocks in the memory 290. When all the blocks in one picture are reconstructed, the reconstructed picture is used as a reference picture for inter-prediction of a block in a subsequent picture to be encoded.

Hereinafter, a video decoding apparatus will be described.

Figure 4:
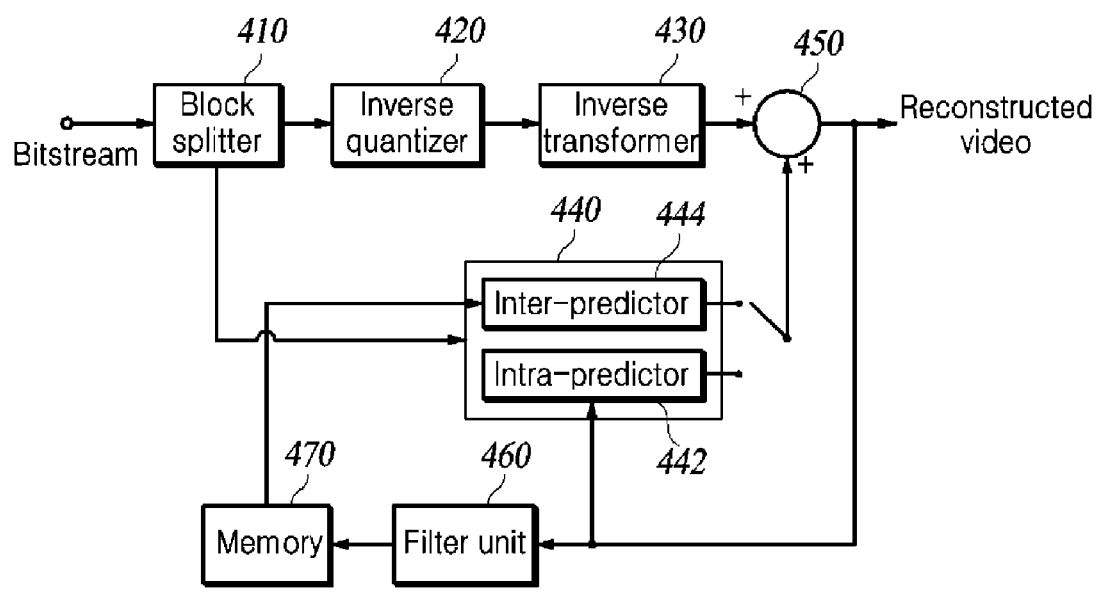
FIG. 4 is an exemplary block diagram of a video decoding apparatus capable of implementing the techniques of the present disclosure.

FIG. 4 is an exemplary block diagram of a video decoding apparatus capable of implementing techniques of the present disclosure.

The video decoding apparatus includes a decoder 410, an inverse quantizer 420, an inverse transformer 430, a predictor 440, an adder 450, a filter unit 460, and a memory 470. As in the case of the video encoding apparatus of FIG. 2, each element of the video encoding apparatus may be implemented as a hardware chip, or may be implemented as software, and the microprocessor may be implemented to execute the functions of the software corresponding to the respective elements.

The decoder 410 decodes a bitstream received from the video encoding apparatus, extracts information related to block splitting to determine a current block to be decoded, and extracts prediction information necessary to reconstruct the current block and information about a residual signal.

The decoder 410 extracts information about the CTU size from a high level syntax such as a sequence parameter set (SPS) or a picture parameter set (PPS), determines the size of the CTU, and splits a picture into CTUs of the determined size. Then, the decoder determines the CTU as the highest layer, that is, the root node, of a tree structure, and extracts splitting information about the CTU to split the CTU using the tree structure (e.g., a QTBT structure).

Upon determining a current block to be decoded through splitting of the tree structure, the decoder 410 extracts information about the prediction type indicating whether the current block is intra-predicted or inter-predicted.

When the prediction type information indicates intra-prediction, the decoder 410 extracts a syntax element for the intra-prediction information (intra-prediction mode) about the current block.

The decoder 410 extracts information about the quantized transform coefficients of the current block as information about the residual signal.

The inverse quantizer 420 inversely quantizes the quantized transform coefficients. The inverse transformer 430 inversely transforms the inversely quantized transform coefficients from the frequency domain to the spatial domain to reconstruct the residual signals, and thereby generates a residual block for the current block.

The predictor 440 includes an intra-predictor 442 and an inter-predictor 444. The intra-predictor 442 is activated when the prediction type of the current block is intra-prediction, and the inter-predictor 444 is activated when the prediction type of the current block is inter-prediction.

The intra-predictor 442 determines an intra-prediction mode of the current block among the plurality of intra-prediction modes from the syntax element for the intra-prediction mode extracted from the decoder 410, and predicts the current block using reference pixels around the current block according to the intra-prediction mode.

The inter-predictor 444 determines motion information about the current block using the syntax element of the intra-prediction mode extracted from the decoder 410, and predicts the current block using the determined motion information.

The adder 450 adds the residual block output from the inverse transformer and the prediction block output from the inter-predictor or intra-predictor to reconstruct the current block. The pixels in the reconstructed current block are utilized as reference samples for intra-prediction of a block to be decoded later.

The filter unit 460 deblock-filters the boundaries between the reconstructed blocks in order to remove blocking artifacts caused by block-by-block decoding and stores the deblock-filtered blocks in the memory 470. When all the blocks in one picture are reconstructed, the reconstructed picture is used as a reference picture for inter-prediction of blocks in a subsequent picture to be decoded.

Examples of the present disclosure generally relate to a technique for signaling QTBT block partition information and a technique for determining block partitioning from the QTBT block partition information. Certain techniques of the present disclosure may be carried out by the encoder 250 of the video encoding apparatus and the decoder 410 of the video decoding apparatus. That is, for example, the encoder 250 and the decoder 410 may carry out the techniques of the present disclosure described with reference to FIGS. 5 to 14 below. In other examples, one or more other units of the video encoding apparatus and the video decoding apparatus may additionally or alternatively serve to carry out the techniques of the present disclosure.

First, a method of expressing QT partition information in a QTBT block partitioning structure will be described.

In a QTBT structure, a CTU, which is a root node, may be first split in a QT manner. The QT splitting may be recursively repeated. A first flag (QT_split_flag) is used to indicate whether a given block is QT-split. For example, as shown in Table 3, the first flag=1 indicates that a given block is split into four blocks of the same size, and the first flag=0 indicates that the given block is not QT split.

TABLE 3

| QT split flag | Value |
|---|---|
| No split | 0 |
| Split | 1 |

Figure 5:
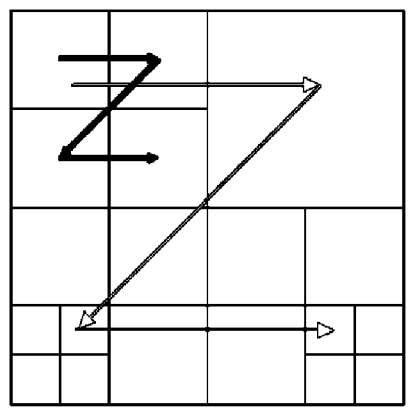
FIG. 5 is a diagram illustrating an example of splitting by a QuadTree scheme and a tree structure representing the splitting.
Figure 5:
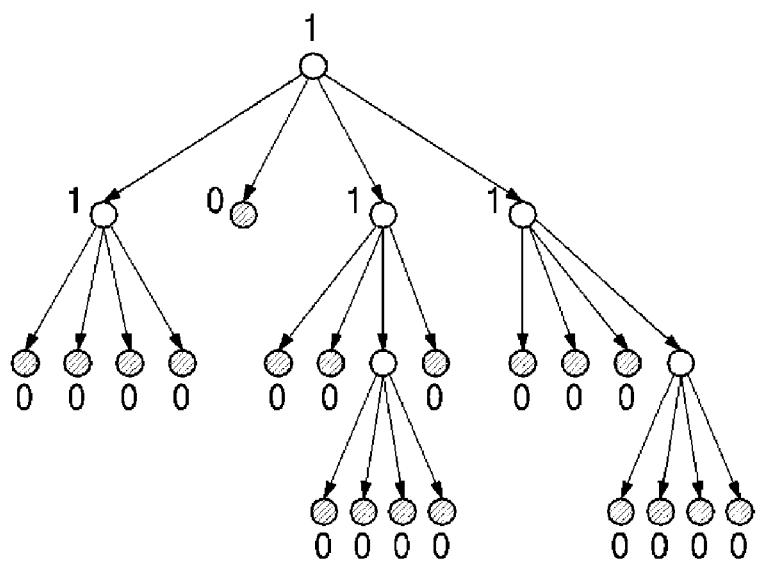

FIG. 5 is a diagram illustrating an example of QuadTree splitting and a tree structure representing the same. "0" or "1" marked on each node is a value of QT_split_flag indicating whether the corresponding node is QT-split. In (b) of FIG. 5, nodes marked in gray are leaf nodes of QT, and are not QT-split anymore. Here, QT_split_flag for blocks is signaled in z-scan order. In other words, the nodes in the tree structure illustrated in (b) of FIG. 5 are signaled in order of "depth first search". As described above, the leaf nodes of the QT in the QTBT partitioning structure may be further partitioned in a BT structure. That is, BT splitting may be recursively performed on blocks that have completed QT partitioning. There may be a plurality of splitting types in the BT. For example, in some examples, there may be types of horizontally or vertically splitting a given block into two blocks of the same size (indicated by ½ in FIG. 3). Further, there may be types of splitting a given block into two asymmetric blocks. The asymmetric splitting may include splitting a given block into two rectangular blocks at a size ratio of 1:3 (indicated by ¼ in FIG. 3) and splitting a given block into two rectangular blocks at a size ratio of 3:1 (indicated by ¾ in FIG. 3). The asymmetric splitting may also include splitting a given block into three (triple) rectangular blocks at a size ratio of 1:2:1 (indicated by '¼ & ¾' in FIG. 3).

As the BT partition information about a given block, a second flag (BT_split_flag) may be used. Since the shape of the BT split block varies depending on the split direction and the split type, the second flag (BT_split_flag) may specify whether a given block is BT-split, and also specify the split direction and the split type in the case of BT splitting.

1. Semantics for BT Split Syntax

First Embodiment

Figure 6:
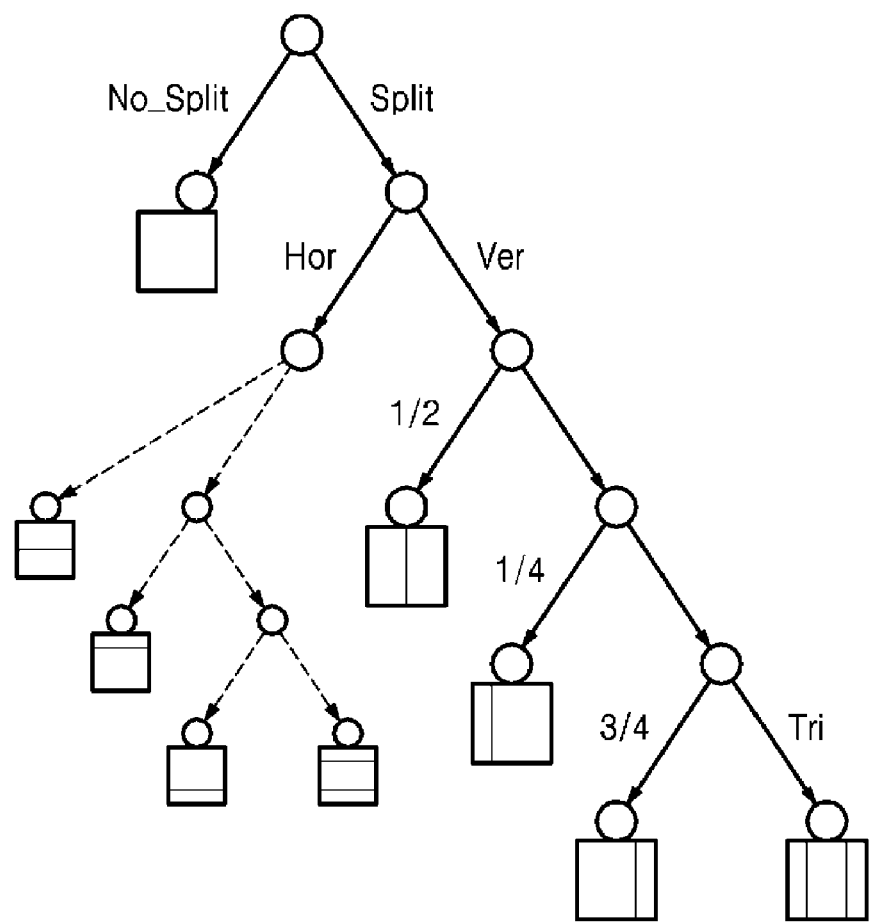
FIG. 6 is a diagram illustrating a tree representation of bit allocation according to a split type in semantics of a BT split syntax according to an embodiment of the present disclosure.

In this embodiment, assuming that the ½ type appears most frequently among the four split types, the fewest bits may be allocated to the ½ type, and more bits may be allocated to the ¾ and triple (tri) types. FIG. 6 is a diagram illustrating a tree representation of bit allocation according to split types. Table 4 shows an example of semantics of the BT split syntax, that is, a codeword for each split type of the BT split flag according to this embodiment.

TABLE 4

| BT split flag | Codeword |
| --- | --- |
| No_split | 0 |
| Split_Hor_1/2 | 100 |
| Split_Hor_1/4 | 1010 |
| Split_Hor_3/4 | 10110 |
| Split_Hor_Tri | 10111 |
| Split_Ver_1/2 | 110 |
| Split_Ver_1/4 | 1110 |
| Split_Ver_3/4 | 11110 |
| Split_Ver_Tri | 11111 |

Second Embodiment

Figure 7:
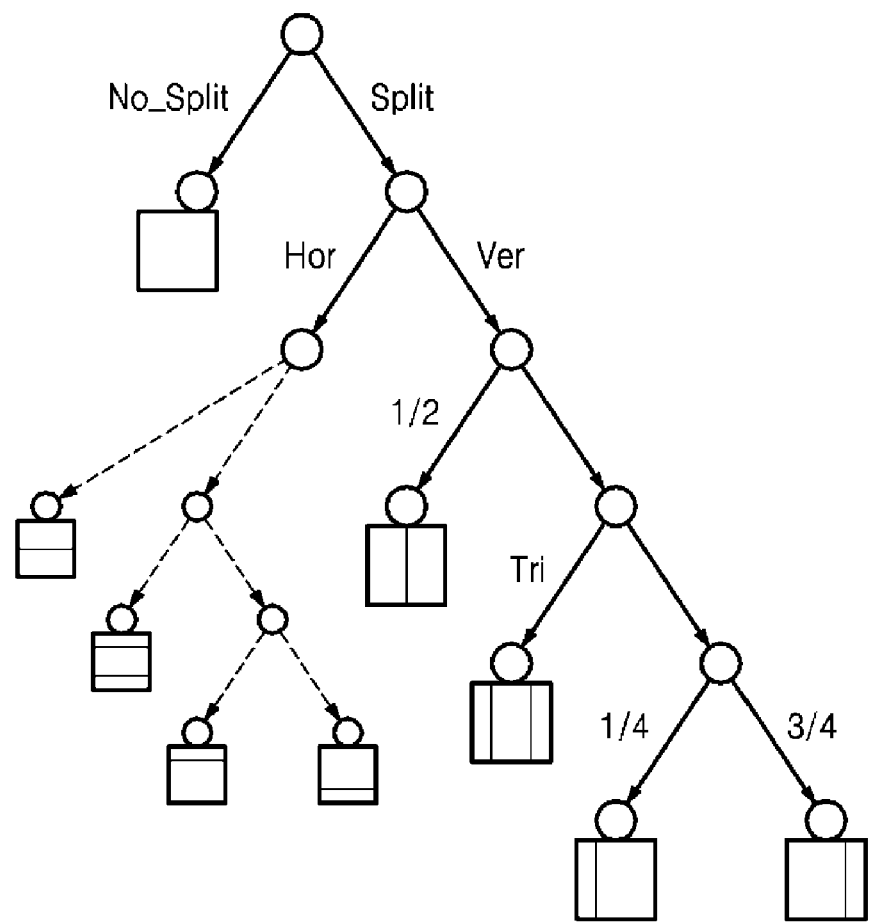
FIG. 7 is a diagram illustrating a tree representation of bit allocation according to a split type in semantics of a BT split syntax according to another embodiment of the present disclosure.

In this embodiment, assuming that the ½ type appears most frequently among the four split types illustrated in FIG. 3, the fewest bits may be allocated to the ½ type, and more bits may be allocated to the ¼ and ¾ types. FIG. 7 is a diagram illustrating a tree representation of bit allocation according to split types. Table 5 shows an example of semantics of the BT split syntax, that is, a codeword for each split type of the BT split flag according to this embodiment. The first bit of the codewords in Table 5 may indicate whether a given block is BT-split. When BT-splitting is performed, the first bit may specify the split direction, and the remaining bits specify the split type.

TABLE 5

| BT split flag | Codeword |
| --- | --- |
| No_split | 0 |
| Split_Hor_1/2 | 100 |
| Split_Hor_1/4 | 10110 |
| Split_Hor_3/4 | 10111 |
| Split_Hor_Tri | 1010 |
| Split_Ver_1/2 | 110 |
| Split_Ver_1/4 | 11110 |
| Split_Ver_3/4 | 11111 |
| Split_Ver_Tri | 1110 |

Third Embodiment

Figure 8:
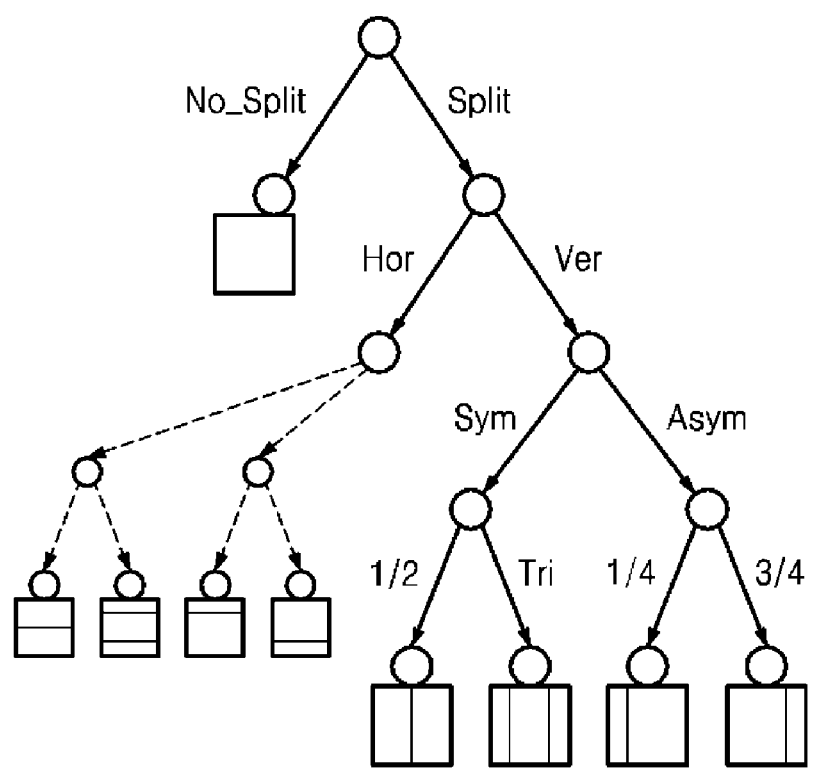
FIG. 8 is a diagram illustrating a tree representation of bit allocation according to a split type in semantics of a BT split syntax according to still another embodiment of the present disclosure.

In this embodiment, a method of allocating the same number of bits to each split type is proposed assuming that four split types are evenly distributed (that is, the frequency of appearance is similar). FIG. 8 illustrates a tree representation of bit allocation according to split types. Here, the positions of the four split types may be switched. Table 6 shows an example of the semantics of the BT split syntax, that is, a codeword for each split type of the BT split flag according to this embodiment. Here, when the positions of the four split types are switched, the bit structure of the codeword for each split type is changed correspondingly.

TABLE 6

| BT split flag | Codeword |
| --- | --- |
| No_split | 0 |
| Split_Hor_1/2 | 1000 |
| Split_Hor_1/4 | 1001 |
| Split_Hor_3/4 | 1010 |
| Split_Hor_Tri | 1011 |
| Split_Ver_1/2 | 1100 |
| Split_Ver_1/4 | 1101 |
| Split_Ver_3/4 | 1110 |
| Split_Ver_Tri | 1111 |

Fourth Embodiment

Figure 9:
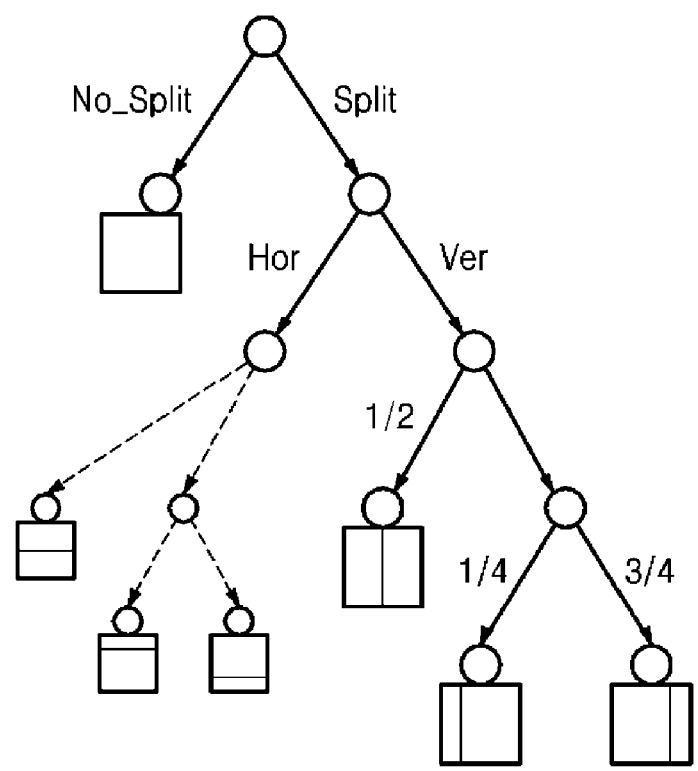
FIG. 9 is a diagram illustrating a tree representation of bit allocation according to a split type in semantics of a BT split syntax according to yet another embodiment of the present disclosure.

This embodiment relates to a signaling method for BT split types when only three split types (½, ¼, ¾) are used except the Tri type among the four split types illustrated in FIG. 3. In this embodiment, assuming that the ½ type appears most frequently among the three split types, the fewest bits may be allocated to the ½ type and more bits may be allocated to the ¼ and ¾ types. FIG. 9 illustrates a tree representation of bit allocation according to split types. Table 7 shows an example of the semantics of the BT split syntax, that is, a codeword according to the BT split flag according to this embodiment.

TABLE 7

| BT split flag | Codeword |
| --- | --- |
| No_split | 0 |
| Split_Hor_1/2 | 100 |
| Split_Hor_1/4 | 1010 |
| Split_Hor_3/4 | 1011 |
| Split_Ver_1/2 | 110 |
| Split_Ver_1/4 | 1110 |
| Split_Ver_3/4 | 1111 |

Fifth Embodiment

Figure 10:
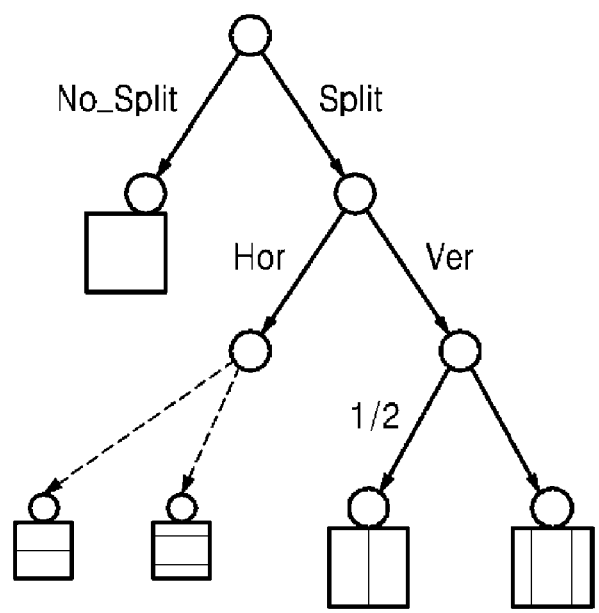
FIG. 10 is a diagram illustrating a tree representation of bit allocation according to a split type in semantics of a BT split syntax according to yet another embodiment of the present disclosure.

This embodiment relates to a signaling method for BT split types when only two split types (Binary, Triple) are used except the ¼ and ¾ types among the four split types illustrated in FIG. 3. In this embodiment, a method of allocating the same number of bits to the two types is proposed on the assumption that the two split types appear at similar frequencies. FIG. 10 is a diagram illustrating a tree representation of bit allocation according to split types. Table 8 shows an example of the semantics of the BT split syntax, that is, a codeword according to the BT split flag according to this embodiment.

TABLE 8

| BT split flag | Codeword |
|---|---|
| No_split | 0 |
| Split_Hor_1/2 | 100 |
| Split_Hor_Tri | 101 |
| Split_Ver_1/2 | 110 |
| Split_Ver_Tri | 111 |

2. Recursive BT Split Constraints

In general, BT splitting has a hierarchical structure and is recursively split. According to an aspect of the present disclosure, it is proposed that constraints be imposed on such a recursively split BT structure to reduce the bits of syntax representing split types. Hereinafter, a conditional BT splitting method having various constraints will be described. In the examples described below, it is assumed that the split types of BT splitting consists of four types, including the ½, ¼, ¾, and Tri types illustrated in FIG. 3.

Split Constraint #1

One method of BT splitting is to designate one or more types of ¼, ¾, and Tri (except ½) of FIG. 3 as leaf nodes. In other words, when a given block is BT-split into a split type designated as leaf nodes, the subblocks of the given block are not split anymore. Thus, except the partition information about a given block, partition information (indicating no split) about the subblocks does not need to be signaled.

For example, in a general case where such a constraint is not added, when a given block is horizontally BT-split in the form of the ¼ type, and one of the sub blocks is 'no split', the bits representing these splits are "1010" (split_hor_¼) and "0" (no split) according to, for example, the codewords listed in Table 2. However, under the constraint of limiting the ¼ type to leaf nodes, the bits for the splits present "1010" (split_hor_¼), and the bit for "0" (no split) is not needed anymore. Therefore, the present disclosure may reduce the number of bits by the split constraint.

Split Constraint #2

As another method of BT splitting, when ½ type block splitting is performed, the general BT splitting method may be repeatedly applied after the block is split. When block splitting of one of the ¼, ¾, and Tri types is performed, a limited split scheme is applied to the split block in the next splitting. Here, the limited BT splitting scheme means that, when the current BT splitting type is vertical splitting (one of the ¼, ¾, and Tri types), the next BT splitting type is limited to horizontal splitting, and that, when the current BT splitting type is horizontal splitting (one of the ¼, ¾, and Tri types), the next BT split type is limited to vertical splitting.

For example, in a general case where such a constraint is not added, when splitting of the ¼ type occurs in the horizontal direction, and then one of the subblocks is vertically split in the form of the ½ type, the bits representing these splits are "1010" (split_hor_¼) and "110" (split_ver_½) according to, for example, the codewords listed in Table 2. In Table 2, the codeword ("110") indicating the split of split_ver_½ consists of "1" indicating splitting, "1" indicating "vertical", and "0" indicating the ½ type. However, under the constraint that the next splitting after the horizontal ¼ splitting is limited to vertical splitting, the bits representing these splits are "1010" (split_hor_¼) and "10" (split_ver_½). That is, the bit indicating "vertical" is not needed. As a result, the split type of split_ver_½ is represented as "10." Thereby, one bit may be saved.

Figure 11:
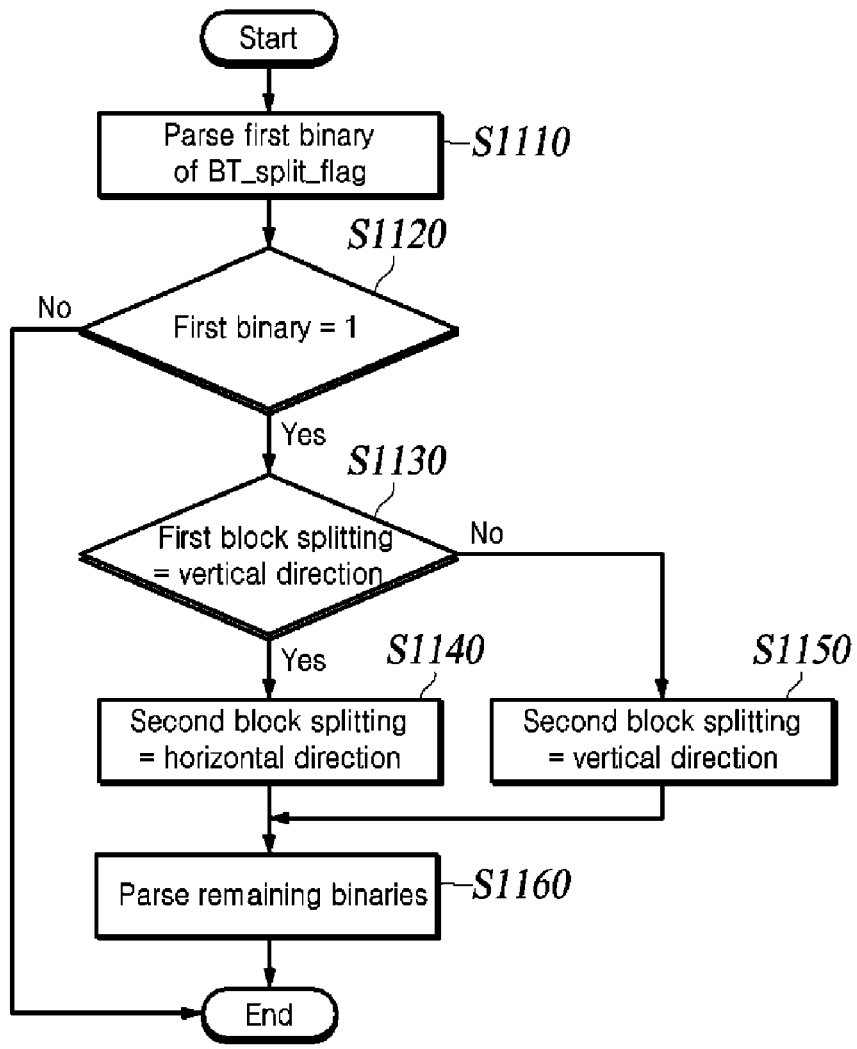
FIG. 11 is a flowchart illustrating a method of determining second splitting according to the constraint by a video decoding apparatus according to an embodiment of the present disclosure.

The new codewords for the respective split types according to the present constraints imposed in the first to fifth embodiments related to Tables 2 to 6 are summarized in Table 9, and the method of determining, by the video decoding apparatus, the second splitting according to the present constraints is illustrated in the flowchart in FIG. 11.

TABLE 9

| BT_split_flag | First embodiment | Second embodiment | Third embodiment | Fourth embodiment | Fifth embodiment |
|---|---|---|---|---|---|
| No_split | 0 | 0 | 0 | 0 | 0 |
| Split_1/2 | 10 | 10 | 100 | 10 | 10 |
| Split_1/4 | 110 | 1110 | 101 | 110 | — |
| Split_3/4 | 1110 | 1111 | 110 | 111 | — |
| Split_Tri | 1111 | 110 | 111 | — | 11 |

FIG. 11 illustrates a method of determining BT partition of a subblock after a given block is BT-split, wherein the first block splitting indicates BT splitting of the given block, and the second block splitting indicates BT splitting of the subblock. As illustrated in FIG. 11, the video decoding apparatus first parses a first binary (i.e., a first bit) of the BT_split_flag (S1110). The first binary of the BT_split_flag indicates whether the subblock is BT-split again. When the first binary is 0 (NO in S1120), the subblock is not BT-split, and the splitting for the subblock is terminated. When the first binary is 1 (YES in S1120), the subblock is BT-split, and the video decoding apparatus determines whether the first block splitting has occurred in the vertical direction (S1130). When the first block splitting has occurred in the vertical direction (YES in S1130), it may be inferred that the second block splitting (i.e., BT splitting of the subblock) is splitting in the horizontal direction according to Split Constraint #2. Therefore, the video decoding apparatus parses the remaining binary numbers of the BT_split_flag in order to determine one of the four split types in the horizontal direction (S1260). When the first block splitting has occurred in the horizontal direction (No in S1130), it may be inferred that the second block splitting (i.e., BT splitting of the subblock) is splitting in the vertical direction according to Split Constraint #2. Therefore, the video decoding apparatus parses the remaining binary numbers of the BT_split_flag in order to determine one of the four split types in the vertical direction (S1260).

Split Constraint #3

Another restrictive BT splitting scheme is to limit the split types such that, when block splitting is performed according to one of the ¼, ¾, and Tri types, only the ½ split type is allowed for the next splitting of the split block. In other words, when the current BT splitting is of one of the ¼, ¾, and Tri types, only the ½ split type is allowed as the next BT split type.

For example, in a general case where such a constraint is not added, when splitting of the ¼ type occurs in the horizontal direction, and then one of the subblocks is vertically split in the form of the ½ type, the bits representing these splits present "1010" (split_hor_¼) and "110" (split_ver_½) according to, for example, the codewords listed in Table 2. In Table 2, the codeword ("110") indicating the split of split_ver_½ consists of "1" indicating splitting, "1" indicating "vertical", and "0" indicating the ½ type. However, under the constraint that the next splitting after the ¼ split type of horizontal splitting is limited to the ½ type, the bits representing these splits present "1010" (split_hor_¼) and "11" (split_ver_½). That is, a bit indicating "½" is not needed. As a result, the split type of split_ver_½ is represented as "11." Thereby, one bit may be saved.

Figure 12:
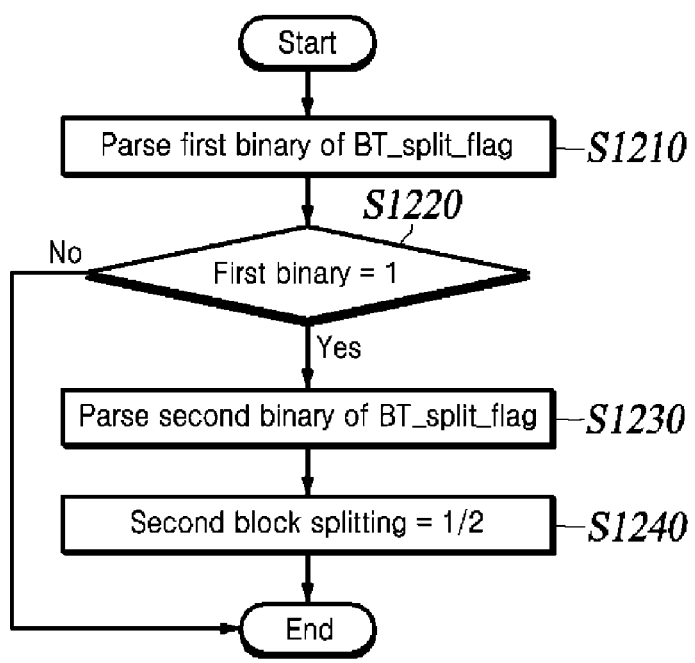
FIG. 12 is a flowchart illustrating a method of determining second splitting according to the constraint by a video decoding apparatus according to an embodiment of the present disclosure.

The new codewords for the respective split types according to the present constraint imposed in the first to fifth embodiments are summarized in Table 10, and the method of determining, by the video decoding apparatus, the second splitting according to the present constraint is illustrated in the flowchart in FIG. 12.

TABLE 10

| BT_split_flag | First embodiment | Second embodiment | Third embodiment | Fourth embodiment | Fifth embodiment |
|---|---|---|---|---|---|
| No_split | 0 | 0 | 0 | 0 | 0 |
| Split_Hor | 10 | 10 | 10 | 10 | 10 |
| Split_Ver | 11 | 1 | 11 | 11 | 11 |

As illustrated in FIG. 12, the video decoding apparatus first parses a first binary (i.e., a first bit) of the BT_split_flag (S1210). The first binary of the BT_split_flag indicates whether the subblock is BT-split again. When the first binary is 0 (NO in S1220), the subblock is not BT-split, and splitting of the subblock is terminated. When the first binary is 1 (YES in S1220), the subblock is BT-split, and the video decoding apparatus parses a second binary (i.e., a second bit) of the BT_split_flag (S1230). The second binary of the BT_split_flag indicates whether the splitting direction of the second block splitting (i.e., the BT splitting of the subblock) is horizontal or vertical. According to Split Constraint #2, the ½ type splitting is allowed as the type of the second block splitting. Accordingly, when the second binary of the BT_split_flag indicates splitting in the horizontal direction, it may be inferred that the second block splitting is split_hor_½. Similarly, when the second binary of the BT_split_flag indicates splitting in the vertical direction, it may be inferred that the second block splitting is split_ver_½ (S1240).

Split Constraint #4

Another method of BT splitting is to apply both a directional constraint and a constraint that allows only the ½ type. For example, when the current BT split type is splitting (of one of the ¼, ¾, and Tri types) in the vertical direction, the next BT split type is limited to the ½ type splitting in the horizontal direction. On the other hand, when the current BT split type is splitting (of one of the ¼, ¾, and Tri types) in the horizontal direction, the next BT split type is limited to the ½ type splitting in the vertical direction. Finally, the semantics of the BT_split_flag syntax for this limited split type are no split ("0") and split ("1"), where "split" may refer to the ½ type splitting in the horizontal direction or the vertical direction depending on the previous BT split type.

For example, in a general case where such a constraint is not added, when splitting of the ¼ type occurs in in the vertical direction, and then one of the subblocks is subjected to vertical splitting of the ½ type, the bits representing these splits present "1010" (split_hor_¼) and "110" (split_ver_½) according to, for example, the codewords listed in Table 2. In Table 2, the codeword ("110") indicating the split of split_ver_½ consists of "1" indicating splitting, "1" indicating "vertical", and "0" indicating the ½ type. However, when the splitting after the ¼ split type of horizontal splitting is limited to the ¼ type of vertical splitting, the bits representing these splits present "1010" (split_hor_¼) and "1" (split_ver_½). That is, the bits indicating vertical and the ½ type are not needed. As a result, the split type of split_ver_½ is represented as "1." Thereby, 2 bits may be saved.

The new codewords for the respective split types according to Split Constraint 4 for all the five embodiments above are summarized in Table 11.

TABLE 11

| BT_split_flag | First embodiment | Second embodiment | Third embodiment | Fourth embodiment | Fifth embodiment |
|---|---|---|---|---|---|
| No_split | 0 | 0 | 0 | 0 | 0 |
| Split | 1 | 1 | 1 | 1 | 1 |

Figure 13:
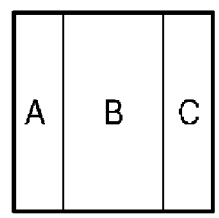
FIG. 13 is a diagram illustrating BT-partitioning of a given block into three regions and into two regions.
Figure 13:
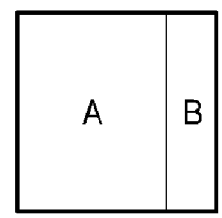

By limiting the splitting to the recursive split type of BT as described above, the bit indicating directionality and/or the bit indicating a type may be saved. It can be seen from Tables 9 to 11 that fewer bits can be allocated by imposing constraints on the split types rather than on the codeword for a general block split type. In Split Constraints #2 to #4 described above, a constraint is imposed on the second splitting after the first splitting (of one of the ¼, ¾, Tri types). The block after the first splitting has a shape as shown in FIG. 13, and the block is split into three parts or two parts according to the first split type. For example, when the first splitting is of the Tri type, the block is divided into three subblocks A, B, and C as shown in (a) of FIG. 13. When the first splitting is of the ¼ or ¾ type, the block is divided into two subblocks A and B as shown in (b) of FIG. 13.

The second splitting after the first splitting may be applied separately to each of the (two or three) divided subblocks as shown in FIG. 13, or the same splitting may be applied to all the subblocks. For example, in the case where the block is divided into three subblocks as shown in (a) of FIG. 13, when it is assumed that all the subblocks are subjected to the same splitting the split type of the three subblocks may be represented by presenting splitting information only once. On the contrary, in the case where the block is divided into three subblocks as shown in (a) of FIG. 13, when it is assumed that each of the divided subblocks is individually split, individual information about the second splitting is needed for each of subblock A, subblock B, and subblock C.

In the present disclosure, Split Constraint #2 to Split Constraint #4 are applicable to the two above-described cases (that is, the case where the same splitting is applied to all the subblocks and the case where splitting is applied to each of the subblocks separately). For example, in the case of Split Constraint #4, when the first splitting is of the Tri type and splitting information is generated for each of the subblocks (subblock A, subblock B, and subblock C) divided in the second splitting, 3 bits in total including 1 bit (no split or split) for the splitting information about subblock A, 1 bit for the splitting information about subblock B, and 1 bit for the splitting information about subblock C are required. In contrast, when the first splitting is of the Tri type and the same splitting information is generated for all the subblocks divided in the second splitting, 1 bit is required to represent the splitting information about subblock A, subblock B, and subblock C.

The CTU-to-CU partitioning structure, the syntax (QT_split_flag and BT_split_flag) for representing the splitting information, and the semantics (i.e. binarization) of the syntax have been described above.

3. Parameters for QTBT Block Partition

In order to signal information about block splitting by the QTBT structure more efficiently, the following parameters may be additionally used. These parameters may be specified as a video level, a sequence level, or a picture level.

In some embodiments employing the BT split types as shown in FIG. 3 in the QTBT block partitioning structure, the following parameters may be used.

MinBtSizeY: Minimum block size of leaf nodes allowed in BT
MinQtSizeY: Minimum block size of leaf nodes allowed in QT
MaxBtSizeY: Maximum block size of a root node allowed by BT
CtbSizeY: CTU size Alternatively, in some embodiments employing the BT split types as shown in FIG. 3 in the QTBT block partitioning structure, parameters listed below may be used. Here, it is assumed that ½ type among the split types of FIG. 3 is classified as a symmetric type, the ¼ and ¾ types are classified as asymmetric types, and the Tri type divides the middle block symmetrically and both side blocks asymmetrically.

SymMinBtSizeY: Minimum block size of BT leaf nodes produced by symmetric splitting
AsymMinBtSizeY: Minimum block size of BT leaf nodes produced by asymmetrical splitting
MinQtSizeY: Minimum block size of leaf nodes allowed in QT
MaxBtSizeY: Maximum block size of a root node allowed in BT
CtbSizeY: CTU size The parameters for the sizes of these blocks allow for more efficient representation of information about block partitioning by the QTBT structure as follows. Here, MinBtSizeY indicates the minimum size of the CU (or CB). Accordingly, when the CU is symmetrically and asymmetrically divided, AsymMinBtSizeY may represent MinBtSizeY. Alternatively, in a certain situation, SymMinBtSizeY may represent MinBtSizeY.

(1) When CtbSizeY is larger than a predefined or predetermined maximum transform size, the video encoding apparatus does not encode the splitting information (QT_split_flag) about QT for the corresponding CTB block, and the video decoding apparatus automatically sets the same to 1. That is, the given CTB is unconditionally QT-split up to the maximum transform size. The maximum transform size may be predefined as a default or may be signaled as one semantic element in the header.

(2) BT splitting is not allowed for a block with a size larger than MaxBtSizeY in QT. Therefore, when the size of the leaf node of the QT is larger than MaxBtSizeY, it may be inferred that the block is not allowed to be BT-split, and accordingly the video encoding apparatus does not signal the splitting information (BT_split_flag) about the BT for the block. When a given block is a leaf node of QT and the size thereof is larger than MaxBtSizeY, the video decoding apparatus neither decodes BT_split_flag, nor performs further splitting of the corresponding block anymore. That is, the video decoding apparatus determines the block as a leaf node (i.e., a CU) of the QTBT.

(3) In QT, a block having the same size as MinQtSizeY is not split anymore. Therefore, the video encoding apparatus does not encode the splitting information (QT_split_flag) about the QT of the block. That is, when the block is split through repeated QT splitting as to have a size of MinQtSizeY, the block neither performs any further QT splitting, nor encodes QT splitting information for the block anymore. Here, the QT splitting information indicates no split ("0") and is not encoded. In addition, when the block is split as to have the size of MinQtSizeY through repeatedly QT splitting, the video decoding apparatus neither decodes the splitting information (QT_split_flag) about the QT for the block (that is, the apparatus automatically sets the same to 0), nor performs nay further QT splitting on the block.

(4) When both the width and height of a given block are equal to MinBtSizeY (including SymMinBtSizeY or AsymMinBtSizeY) during BT splitting, no further BT splitting is performed. Accordingly, the video encoding apparatus does not encode the splitting information (BT_split_flag) about the BT for the given block, but automatically sets the same to 0. That is, when the width and height of the block are split to the size of MinBtSizeY during repeated BT splitting, the video decoding apparatus does not decode the splitting information (BT_split_flag) about the BT for the block (that is, the apparatus automatically sets the same to 0), but determines the block as a leaf node (i.e., a CU) of QTBT.

Figure 14:
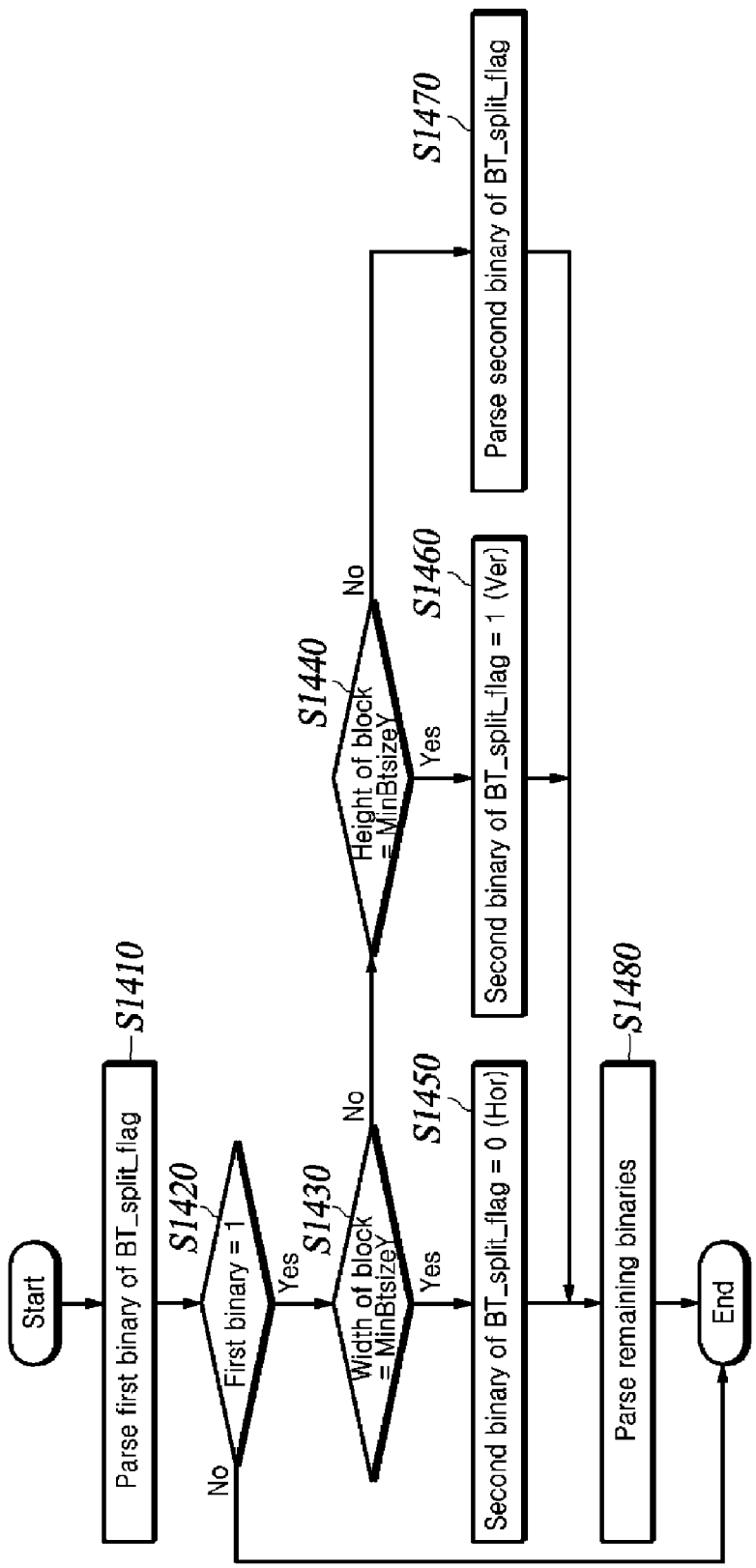
FIG. 14 is a flowchart illustrating a process for a BT exception in which the video decoding apparatus does not signal the second binary number of BT_split_flag.

(5) When the width or height of a given block is equal to MinBtSizeY and the first binary of BT_split_flag is "1", it may be inferred whether the direction of BT splitting of the given block is horizontal or vertical. Therefore, the second binary of BT_split_flag, which indicates the BT splitting direction, is not needed. That is, when the width of a given block is equal to MinBtSizeY and the first binary of BT_split_flag is "1", it may be may inferred that the BT splitting of the given block is horizontal splitting ("0"), and therefore the encoding/decoding apparatus does not encode/decode the second binary of BT_split_flag for the given block. In contrast, when the height of a given block is equal to MinBtSizeY and the first binary of BT_split_flag is "1", it may be inferred that the BT splitting of the given block is vertical splitting ("1"), and therefore the encoding/decoding apparatus does not encode/decode the second binary of BT_split_flag for the given block. FIG. 14 is a flowchart illustrating a process for a BT exception in which the video decoding apparatus does not signal the second binary of BT_split_flag.

As illustrated in FIG. 14, the video decoding apparatus first parses a first binary (i.e., a first bit) of the BT_split_flag (S1410). The first binary of the BT_split_flag indicates whether the subblock is BT-split again. When the first binary is 0 (NO in S1420), the given block is not BT-split, and splitting of the given block is terminated as is. When the first binary is 1 (YES in S1420), the subblock is BT-split, and the video decoding apparatus determines whether the width of the block is equal to MinBtSizeY (S1430). When the width of the given block is equal to MinBtSizeY (YES in S1430), the apparatus infers that the BT splitting direction of the given block is horizontal, and parses the remaining binaries to determine the split type (i.e., one of the types in (b) of FIG. 3) (S1480). When the width of the given block is not equal to MinBtSizeY (NO in S1430), the apparatus further determines whether the height of the given block is equal to MinBtSizeY. When the height of the given block is equal to MinBtSizeY (YES in S1440), the apparatus infers that the BT splitting direction of the given block is vertical, and parses the remaining binaries to determine the split type (i.e., one of the types in (a) of FIG. 3) (S1480). When the height of the given block is not equal to MinBtSizeY (NO in S1440), the second binary of the BT_split_flag is parsed. In this case, the second binary indicates the BT splitting direction of the given block. The remaining binaries are parsed to determine a given split type (S1480).

4. High-Level Syntax (HLS)

As described above, such parameters may be specified as a video level, sequence level, or picture level. Accordingly, information representing these parameters may be included in a header of a high level that includes a sequence parameter set (SPS), a picture parameter set (PPS), and a video parameter set (VPS). In the description below, high-level syntaxes (HLSs) for efficiently presenting these parameters are provided.

First Embodiment (HLS)

The syntax elements proposed in this embodiment are given below. Considering that a block size can be expressed as a power of 2, the syntax elements below are expressed as a logarithm of an actual value to be defined with base 2.

1) log2_luma_min_BT_size_minus2: Defines the minimum BT block size allowed in BT (min BT block size) based on the luma block.
2) log2_diff_luma_min_QT_min_BT_size: Defines the difference (min QT block size−min BT block size) between the minimum block size (min QT block size) of leaf nodes allowed in QT and the minimum block size (min BT block size) allowed in BT, based on the luma block.
3) log2_diff_luma_max_BT_min_QT_size: Defines a difference (max BT block size−min QT block size) between the maximum block size (max BT block size) of the root node allowed in BT and the minimum block size (min QT block size) of the leaf nodes allowed in QT, based on the luma block.
4) log2_diff_luma_max_QT_max_BT_size: Defines a difference (max QT block size−max BT block size: i.e., size of CTU block) between the maximum block size (max QT block size) allowed in QT and the maximum block size (max BT block size) of the root node allowed in BT, based on the luma block.

Table 12 exemplarily shows the syntax elements defined in the sequence parameter set (SPS) header. As described above, the syntax elements may be defined in the picture parameter set (PPS) header or the like.

TABLE 12

| | Descriptor |
|---|---|
| seq_parameter_set_rbsp( ) { | |
| ... | |
| log2_luma_min_BT_size_minus2 | ue(v) |
| log2_diff_luma_min_QT_min_BT_size | ue(v) |
| log2_diff_luma_max_BT_min_QT_size | ue(v) |
| log2_diff_luma_max_QT_max_BT_size | ue(v) |
| ... | |

As derived from the syntax elements above, the actual size (MinBtSizeY) of the min BT luma block is given by Equation 5, the actual size (MinQtSizeY) of the min QT block is given by Equation 6, and the actual size (MaxBtSizeY) of the max BT block is given by Equation 7, and the actual CTU size (CtbSizeY) is given by Equation 8.

$$MinBtLog2SizeY = log2\_luma\_min\_BT\_size\_minus2 + 2$$

$$MinQtLog2SizeY = MinBtLog2SizeY + log2\_diff\_luma\_min\_QT\_min\_BT\_size$$

$$MaxBtLog2SizeY = MinQtLog2SizeY + log2\_diff\_luma\_max\_BT\_min\_QT\_size$$

$$CtbLog2SizeY = MaxBtLog2SizeY + log2\_diff\_luma\_max\_QT\_max\_BT\_size$$

$$MinBtSizeY = 1 << MinBtLog2SizeY \quad (5)$$

$$MinQtSizeY = 1 << MinQtLog2SizeY \quad (6)$$

$$MaxBtSizeY = 1 << MaxBtLog2SizeY \quad (7)$$

$$CtbSizeY = 1 << CtbLog2SizeY \quad (8)$$

Second Embodiment (HLS)

The syntax elements proposed in this embodiment are given below.

1) log2_sym_luma_min_BT_size_minus2: Defines the minimum block size (symmetric min BT block size) allowed in BT based on a symmetrically split luma block.
2) log2_asym_luma_min_BT_size_minus1: Defines the minimum block size (asymmetric min BT block size) allowed in BT based on an asymmetrically split luma block.
3) log2_diff_luma_min_QT_min_BT_size: Defines the difference between the min BT block size and the min QT block size (min QT block size−symmetric min BT block size).
5) log2_diff_luma_max_BT_min_QT_size: Defines the difference (max BT block size−min QT block size) between the maximum block size (max BT block size) of the root node allowed in BT and the minimum block size (min QT block size) of the leaf nodes allowed in QT, based on the luma block.
6) log2_diff_luma_max_QT_max_BT_size: Defines the difference (max QT block size−max BT block size: i.e., the size of a CTU block) between the maximum block size (max QT block size) allowed in QT and the maximum block size (max BT block size) of the root node allowed in BT, based on the luma block.

Table 13 exemplarily shows the syntax elements defined in the sequence parameter set (SPS). As described above, the syntax elements may be defined in the picture parameter set (PPS) or the like.

TABLE 13

| | Descriptor |
|---|---|
| seq_parameter_set_rbsp( ) { | |
| ... | |
| log2_sym_luma_min_BT_size_minus2 | ue(v) |
| log2_asym_luma_min_BT_size_minus1 | ue(v) |
| log2_diff_luma_min_QT_min_BT_size | ue(v) |
| log2_diff_luma_max_BT_min_QT_size | ue(v) |
| log2_diff_luma_max_QT_max_BT_size | ue( ) |
| ... | |

As derived from the syntax elements above, the actual size (SymMinBtSizeY) of the symmetric min BT luma block is given by Equation 9, the size (AsymMinBtSizeY) of an asymmetric min BT luma block is given by Equation 10, the size (MinQtSizeY) of the min QT block is given by Equation 11, the size (MaxBtSizeY) of the max BT block is given by Equation 12, and the CTU size (CtbSizeY) is given by Equation 13.

$$SymMinBtLog2SizeY = log2\_sym\_luma\_min\_BT\_size\_minus2+2$$

$$AsymMinBtLog2SizeY = log2\_asym\_luma\_min\_BT\_size\_minus1+1$$

$$MinQtLog2SizeY = SymMinBtLog2SizeY + log2\_diff\_luma\_min\_QT\_min\_BT\_size$$

$$MaxBtLog2SizeY = MinQtLog2SizeY + log2\_diff\_luma\_max\_BT\_min\_QT\_size$$

$$CtbLog2SizeY = MaxBtLog2SizeY + log2\_diff\_luma\_max\_QT\_max\_BT\_size$$

$$SymMinBtSizeY = 1 << SymMinBtLog2SizeY \qquad (9)$$

$$AsymMinBtSizeY = 1 << AsymMinBtLog2SizeY \qquad (10)$$

$$MinQtSizeY = 1 << MinQtLog2SizeY \qquad (11)$$

$$MaxBtSizeY = 1 << MaxBtLog2SizeY \qquad (12)$$

$$CtbSizeY = 1 << CtbLog2SizeY \qquad (13)$$

Third Embodiment (HLS)

The syntax elements proposed in this embodiment are given below.

log2_asym_luma_min_BT_size_minus1: Defines the minimum block size (asymmetric min BT block size) allowed in BT, based on an asymmetrically split luma block.

2) log2_diff_luma_min_QT_min_BT_size: Defines the difference (symmetric min QT block size−min BT block size) between the minimum block size (min QT block size) of leaf nodes allowed in QT based on the luma block and the minimum block size (symmetric min BT block size) allowed in BT based on a symmetrically split luma block.

3) log2_diff_luma_max_BT_min_QT_size: Difference between max BT block size and min QT block size (max BT block size−min QT block size)

4) log2_diff_luma_max_QT_max_BT_size: Difference between max QT block size and max BT block size (max QT block size−max BT block size: i.e., the size of a CTU block)

Table 13 exemplarily shows the syntax elements defined in the SPS. As described above, the syntax elements may be defined in the PPS or the like

TABLE 14

| | Descriptor |
|---|---|
| seq_parameter_set_rbsp( ) { | |
| ... | |
| log2_asym_luma_min_BT_size_minus1 | ue(v) |
| log2_diff_luma_min_QT_min_BT_size | ue(v) |
| log2_diff_luma_max_BT_min_QT_size | ue(v) |
| log2_diff_luma_max_QT_max_BT_size | ue(v) |
| ... | |

As derived from the syntax elements above, the actual size (SymMinBtSizeY) of the symmetric min BT luma block is given by Equation 14, the size (AsymMinBtSizeY) of an asymmetric min BT luma block is given by Equation 15, the size (MinQtSizeY) of the min QT block is given by Equation 16, the size (MaxBtSizeY) of the max BT block is given by Equation 17, and the CTU size (CtbSizeY) is given by Equation 18.

$$SymMinBtLog2SizeY = log2\_asym\_luma\_min\_BT\_size\_minus1+2$$

$$AsymMinBtLog2SizeY = log2\_asym\_luma\_min\_BT\_size\_minus1+1$$

$$MinQtLog2SizeY = SymMinBtLog2SizeY + log2\_diff\_luma\_min\_QT\_min\_BT\_size$$

$$MaxBtLog2SizeY = MinQtLog2SizeY + log2\_diff\_luma\_max\_BT\_min\_QT\_size$$

$$CtbLog2SizeY = MaxBtLog2SizeY + log2\_diff\_luma\_max\_QT\_max\_BT\_size$$

$$SymMinBtSizeY = 1 << SymMinBtLog2SizeY \qquad (14)$$

$$AsymMinBtSizeY = 1 << AsymMinBtLog2SizeY \qquad (15)$$

$$MinQtSizeY = 1 << MinQtLog2SizeY \qquad (16)$$

$$MaxBtSizeY = 1 << MaxBtLog2SizeY \qquad (17)$$

$$CtbSizeY = 1 << CtbLog2SizeY \qquad (18)$$

In some examples, as described above in relation to the second embodiment, when the QT common depth of the QT is expressed in any one of the SPS, the PPS, and a slice header, the QT common depth set at a level higher than the CTU (i.e., set in the SPS, PPS, or slice header) may be referenced for the QT common depth for the luminance and chrominance in a CTU unit. In some other examples, the QT common depth for the luminance and chrominance in a CTU unit may be expressed as a difference from the QT common depth set above the CTU.

According to the first to third embodiments described above, parameters related to the block size may be defined as a video level, a sequence level, or a picture level. In fourth to sixth embodiments described below, additional parameters indicating difference (i.e., offsets) from the above-described parameters are defined in a header lower than the header used in the first to third embodiments to provide a method for adjusting the parameters at lower levels. That is, it is proposed that the syntax elements proposed in the first to third embodiments be expressed in the upper header and the syntax elements for defining the offsets for the syntax elements expressed in the upper header be expressed in the lower header. Here, the upper header may be a header of the sequence level or the picture level. When the upper header is a sequence level header, the lower header may be a picture level header or a slice header. When the upper header is a picture level header, the lower header may be a slice header.

According to this method, using a syntax value expressed in a lower header (e.g., the slice header), the min BT block size, min QT block size, max BT block size, and/or max QT block size may be adjusted at the corresponding level (e.g., slice-level).

Fourth Embodiment (HLS)

Syntax Elements of the Upper Header

The syntax elements included in the upper header are the same as those in the first embodiment.

1) log2_luma_min_BT_size_minus1
2) log2_diff_luma_min_QT_min_BT_size 3) log2_diff_luma_max_BT_min_QT_size
4) log2_diff_luma_max_QT_max_BT_size Syntax Elements of the Lower Header The following syntax elements are included in the lower header.
1) delta_log2_luma_min_BT_size: Defines an offset (delta min BT block size) added to the min BT block size specified by the syntax elements defined in the upper header based on the luma block.
2) delta_log2_luma_min_QT_size: Defines an offset (delta min QT block size) added to the min QT block size specified by the syntax elements defined in the upper header.
3) delta_log2_luma_max_BT_size: Defines an offset (delta max BT block size) added to the max BT block size specified by the syntax elements defined in the upper header.
4) delta_log2_luma_max_QT_size: Defines an offset (delta max QT block size) added to the max QT block size specified by the syntax elements defined in the upper header.

As derived from the syntax elements of the upper header and the lower header, the actual size (MinBtSizeY) of the min BT luma block is given by Equation 19, the actual size (MinQtSizeY) of the min QT block is given by Equation 20, the actual size (MaxBtSizeY) of the max BT block size is given by Equation 21, and the actual CTU size (CtbSizeY) is given by Equation 22.

MinBtLog2SizeY=log2_luma_min_BT_size_minus2+2

MinQtLog2SizeY=MinBtLog2SizeY+
log2_diff_luma_min_QT_min_BT_size

MaxBtLog2SizeY=MinQtLog2SizeY+
log2_diff_luma_max_BT_min_QT_size

CtbLog2SizeY=MaxBtLog2SizeY+
log2_diff_luma_max_QT_max_BT_size

MinBtLog2SizeY=MinBtLog2SizeY+
delta_log2_luma_min_BT_size

MinQtLog2SizeY=MinQtLog2SizeY+
delta_log2_luma_min_QT_size

MaxBtLog2SizeY=MaxBtLog2SizeY+
delta_log2_luma_max_BT_size

CtbLog2SizeY=CtbLog2SizeY+
delta_log2_luma_max_QT_size

MinBtSizeY=1<<MinBtLog2SizeY  (19)

MinQtSizeY=1<<MinQtLog2SizeY  (20)

MaxBtSizeY=1<<MaxBtLog2SizeY  (21)

CtbSizeY=1<<CtbLog2SizeY  (22)

Fifth Embodiment (HLS)

Syntax Elements of the Upper Header

The syntax elements included in the upper header are the same as those in the second embodiment.
1) log2_sym_luma_min_BT_size_minus2
2) log2_asym_luma_min_BT_size_minus1
3) log2_diff_luma_min_QT_min_BT_size
4) log2_diff_luma_max_BT_min_QT_size
5) log2_diff_luma_max_QT_max_BT_size Syntax Elements of the Lower Header The following syntax elements are included in the lower header.
1) delta_log2_sym_luma_min_BT_size: Defines an offset (delta symmetric min BT block size) added to the symmetric min BT block size specified by the syntax elements defined in the upper header based on the symmetrically split luma block.
2) delta_log2_asym_luma_min_BT_size: Defines an offset (delta asymmetric min BT block size) added to the symmetric min BT block size specified by the syntax elements defined in the upper header based on the asymmetrically split luma block.
3) delta_log2_luma_min_QT_size: Defines an offset (delta min QT block size) added to the min QT block size specified by the syntax elements defined in the upper header.
4) delta_log2_luma_max_BT_size: Defines an offset (delta max BT block size) added to the max BT block size specified by the syntax elements defined in the upper header.
5) delta_log2_luma_max_QT_size: Defines an offset (delta max QT block size) added to the max QT block size specified by the syntax elements defined in the upper header.

As derived from the syntax elements of the upper header and the lower header, the actual size (SymMinBtSizeY) of the symmetric min BT luma block is given by Equation 23, the actual size (AsymMinBtSizeY) of the asymmetric min BT luma block is given by Equation 24, the actual size (MinQtSizeY) of the min QT block is given by Equation 25, the actual size (MaxBtSizeY) of the max BT block is given by Equation 26, and the actual CTU size (CtbSizeY) is given by Equation 27.

SymMinBtLog2SizeY=log2_sym_luma_min_BT_size_minus2+2

AsymMinBtLog2SizeY=log2_asym_luma_min_BT_size_minus1+1

MinQtLog2SizeY=SymMinBtLog2SizeY+
log2_diff_luma_min_QT_min_BT_size

MaxBtLog2SizeY=MinQtLog2SizeY+
log2_diff_luma_max_BT_min_QT_size

CtbLog2SizeY=MaxBtLog2SizeY+
log2_diff_luma_max_QT_max_BT_size

SymMinBtLog2SizeY=SymMinBtLog2SizeY+
delta_log2_sym_luma_min_BT_size

AsymMinBtLog2SizeY=AsymMinBtLog2SizeY+
delta_log2_asym_luma_min_BT_size

MinQtLog2SizeY=MinQtLog2SizeY+
delta_log2_luma_min_QT_size

MaxBtLog2SizeY=MaxBtLog2SizeY+
delta_log2_luma_max_BT_size

CtbLog2SizeY=CtbLog2SizeY+
delta_log2_luma_max_QT_size

SymMinBtSizeY=1<<SymMinBtLog2SizeY  (23)

AsymMinBtSizeY=1<<AsymMinBtLog2SizeY  (24)

$$\text{MinQtSize}Y=1<<\text{MinQtLog2Size}Y \qquad (25)$$

$$\text{MaxBtSize}Y=1<<\text{MaxBtLog2Size}Y \qquad (26)$$

$$\text{CtbSize}Y=1<<\text{CtbLog2Size}Y \qquad (27)$$

Sixth Embodiment (HLS)

Syntax Elements of the Upper Header

The syntax elements included in the upper header are the same as those in the third embodiment.
1) log2_asym_luma_min_BT_size_minus1
2) log2_diff_luma_min_QT_min_BT_size
3) log2_diff_luma_max_BT_min_QT_size
4) log2_diff_luma_max_QT_max_BT_size Syntax Elements of the Lower Header The following syntax elements are included in the lower header.
1) delta_log2_asym_luma_min_BT_size: Defines an offset (delta asymmetric min BT block size) added to the asymmetric min BT block size specified by the syntax elements defined in the upper header based on the luma block.
2) delta_log2_luma_min_QT_size: Defines an offset (delta min QT block size) added to the size of the min QT block specified by the syntax elements defined in the upper header.
3) delta_log2_luma_max_BT_size: Defines an offset (delta max BT block size) added to the max BT block size specified by the syntax elements defined in the upper header.
4) delta_log2_luma_max_QT_size: Defines an offset (delta max QT block size) added to the max QT block size specified by the syntax elements defined in the upper header.

As derived from the syntax elements of the upper header and the lower header, the actual size (SymMinBtSizeY) of the symmetric min BT luma block is given by Equation 28, the actual size (AsymMinBtSizeY) of the asymmetric min BT luma block is given by Equation 29, the actual size (MinQtSizeY) of the min QT block is given by Equation 30, the actual size (MaxBtSizeY) of the max BT block is given by Equation 31, and the actual CTU size (CtbSizeY) is given by Equation 32.

$$\text{SymMinBtLog2Size}Y=\text{log2\_asym\_luma\_min\_BT\_size\_minus1}+2$$

$$\text{AsymMinBtLog2Size}Y=\text{log2\_asym\_luma\_min\_BT\_size\_minus1}+1$$

$$\text{MinQtLog2Size}Y=\text{SymMinBtLog2Size}Y+ \text{log2\_diff\_luma\_min\_QT\_min\_BT\_size}$$

$$\text{MaxBtLog2Size}Y=\text{MinQtLog2Size}Y+ \text{log2\_diff\_luma\_max\_BT\_min\_QT\_size}$$

$$\text{CtbLog2Size}Y=\text{MaxBtLog2Size}Y+ \text{log2\_diff\_luma\_max\_QT\_max\_BT\_size}$$

$$\text{SymMinBtLog2Size}Y=\text{SymMinBtLog2Size}Y+ \text{delta\_log2\_asym\_luma\_min\_BT\_size}+1$$

$$\text{AsymMinBtLog2Size}Y=\text{AsymMinBtLog2Size}Y+ \text{delta\_log2\_luma\_min\_BT\_size}$$

$$\text{MinQtLog2Size}Y=\text{MinQtLog2Size}Y+ \text{delta\_log2\_luma\_min\_QT\_size}$$

$$\text{MaxBtLog2Size}Y=\text{MaxBtLog2Size}Y+ \text{delta\_log2\_luma\_max\_BT\_size}$$

$$\text{CtbLog2Size}Y=\text{CtbLog2Size}Y+ \text{delta\_log2\_luma\_max\_QT\_size}$$

$$\text{SymMinBtSize}Y=1<<\text{SymMinBtLog2Size}Y \qquad (28)$$

$$\text{AsymMinBtSize}Y=1<<\text{AsymMinBtLog2Size}Y \qquad (29)$$

$$\text{MinQtSize}Y=1<<\text{MinQtLog2Size}Y \qquad (30)$$

$$\text{MaxBtSize}Y=1<<\text{MaxBtLog2Size}Y \qquad (31)$$

$$\text{CtbSize}Y=1<<\text{CtbLog2Size}Y \qquad (32)$$

Using the information about the HLS illustrated above, the video decoding apparatus may calculate parameters such as MinBtSizeY, SymMinBtSizeY, AsymMinBtSizeY, MinQtSizeY, MaxBtSizeY, and CtbSizeY, and may infer, based on the calculated parameters, whether QT splitting or BT splitting is applied to some (sub-) blocks in the operation of determining the QTBT block partitioning structure of a given CTU or CTB, without decoding QT_split_flag or BT_split_flag. The video encoding apparatus does not signal QT_split_flag or BT_split_flag for some (sub-)blocks which the video decoding apparatus may infer from the parameters.

Although exemplary embodiments have been described for illustrative purposes, those skilled in the art will appreciate that and various modifications and changes are possible, without departing from the idea and scope of the embodiments. Exemplary embodiments have been described for the sake of brevity and clarity. Accordingly, one of ordinary skill would understand the scope of the embodiments is not limited by the explicitly described above embodiments but is inclusive of the claims and equivalents thereof.

What is claimed is:

1. A method for decoding video data, comprising:
receiving a bitstream containing encoded data for a block of video data;
parsing first syntax elements for block partitioning defined at header information of a high level from the bitstream, wherein the block partitioning is based on a partitioning structure in which a multi-type tree is rooted from a leaf node of a quad tree (QT), and the multi-type tree includes a binary tree (BT) in which a block corresponding to a parent node is allowed to be divided into two subblocks corresponding to two child nodes and a triple tree in which a parent node is allowed to be divided into three subblocks corresponding to three child nodes;
parsing second syntax elements for modification for some of the first syntax elements defined at header information of a low level belonging to the high level;
calculating parameters for block partitioning from the first syntax elements and the second syntax elements, wherein the parameters for block partitioning comprise a first parameter indicating a minimum block size of a leaf node allowed in the BT, a second parameter indicating a minimum block size of a leaf node allowed in the QT, a third parameter indicating a maximum block size of a root node allowed in the BT, and a fourth parameter indicating a size of the block of the video data;
parsing third syntax elements which specify the partitioning structure for the block of the video data from the bitstream under restrictions imposed based on the calculated parameters to derive the partitioning structure for the block of the video data, the block of the video data belonging to the low level; and
decoding subblocks corresponding to leaf nodes of the partitioning structure for the block of the video data based on the bitstream, wherein some of the first syntax elements explicitly indicates some of the parameters for block partitioning, and wherein the others of the first syntax elements indicate a difference between some of the parameters for block partitioning, and wherein the deriving of the partitioning structure comprises inferring that a given subblock is not QT-split anymore when the given subblock is equal to the size indicated by the second parameter.

2. The method of claim 1, wherein the first syntax elements include elements for specifying:
the size of the block of the video data;
the minimum block size of the leaf node allowed in the BT;
a difference between the minimum block size of the leaf node allowed in the BT and the minimum block size of the leaf node allowed in the QT; and
a difference between the maximum block size of the root node allowed in the BT and the minimum block size of the leaf node allowed in the QT.

3. The method of claim 1, wherein the third syntax elements include elements for indicating:
whether a block corresponding to a parent node in the QT is divided into four subblocks corresponding to four child nodes;
whether a block corresponding to a parent node in the multi-type tree is divided into two subblocks corresponding to two child nodes or into three subblocks corresponding to three child nodes; and
a direction in which a block corresponding to a parent node in the multi-type tree is divided into subblocks.

4. The method of claim 1, wherein the deriving of the partitioning structure comprises:
when a height of a given subblock is equal to the size indicated by the first parameter and the given subblock is BT-split, inferring that the given subblock is split in a vertical direction.

5. The method of claim 1, wherein the deriving of the partitioning structure comprises:
when a width of a given subblock is equal to the size indicated by the first parameter and the given subblock is BT-split, inferring that the given subblock is split in a horizontal direction.

6. The method of claim 1, wherein the deriving of the partitioning structure comprises:
when a size of the leaf node of the QT is greater than the size indicated by the third parameter, inferring that the leaf node of the QT is a leaf node of the partitioning structure.

7. The method of claim 1, wherein the deriving of the partitioning structure comprises:
when the size indicated by the fourth parameter is greater than a predefined or predetermined maximum transform size, inferring that the block of the video data is recursively QT-split into the maximum transform size.

8. A method for encoding video data, comprising:
determining parameters for block partitioning at a high level, wherein the block partitioning is based on a partitioning structure in which a multi-type tree is rooted from a leaf node of a quad tree (QT), and the multi-type tree includes a binary tree (BT) in which a block corresponding to a parent node is allowed to be divided into two subblocks corresponding to two child nodes and a triple tree in which a parent node is allowed to be divided into three subblocks corresponding to three child nodes;

encoding first syntax elements for block partitioning in header information of the high level;
determining the parameters for the block partitioning at a low level belonging to the high level;
encoding second syntax elements for modification for some of the first syntax elements in header information of the low level;
encoding third syntax elements which specify the partitioning structure for the block of the video data belonging to the low level under restrictions imposed by the parameters; and
encoding subblocks corresponding to leaf nodes of the partitioning structure for the block of the video data,
wherein the parameters for block partitioning comprise a first parameter indicating a minimum block size of a leaf node allowed in the BT, a second parameter indicating a minimum block size of a leaf node allowed in the QT, a third parameter indicating a maximum block size of a root node allowed in the BT, and a fourth parameter indicating a size of the block of the video data;
wherein some of the first syntax elements explicitly indicates some of the parameters for block partitioning, and wherein the others of the first syntax elements indicate a difference between some of the parameters for block partitioning, and
wherein a given subblock is not QT-split anymore when the given subblock is equal to the size indicated by the second parameter.

9. The method of claim 8, wherein the first syntax elements include elements for specifying:
the size of the block of the video data;
the minimum block size of the leaf node allowed in the BT;
a difference between the minimum block size of the leaf node allowed in the BT and the minimum block size of the leaf node allowed in the QT; and
a difference between the maximum block size of the root node allowed in the BT and the minimum block size of the leaf node allowed in the QT.

10. The method of claim 8, wherein the third syntax elements include elements for indicating:
whether a block corresponding to a parent node in the QT is divided into four subblocks corresponding to four child nodes;
whether a block corresponding to a parent node in the multi-type tree is divided into two subblocks corresponding to two child nodes or into three subblocks corresponding to three child nodes; and
a direction in which a block corresponding to a parent node in the multi-type tree is divided into subblocks.

11. A non-transitory computer readable medium storing a bitstream containing encoded data for a block of video data, the bitstream being decoded by processes of:
receiving a bitstream containing encoded data for a block of video data;
parsing first syntax elements for block partitioning defined at header information of a high level from the bitstream, wherein the block partitioning is based on a partitioning structure in which a multi-type tree is rooted from a leaf node of a quad tree (QT), and the multi-type tree includes a binary tree (BT) in which a block corresponding to a parent node is allowed to be divided into two subblocks corresponding to two child nodes and a triple tree in which a parent node is allowed to be divided into three subblocks corresponding to three child nodes;

parsing second syntax elements for modification for some of the first syntax elements defined at header information of a low level belonging to the high level;

calculating parameters for block partitioning from the first syntax elements and the second syntax elements, wherein the parameters for block partitioning comprise a first parameter indicating a minimum block size of a leaf node allowed in the BT, a second parameter indicating a minimum block size of a leaf node allowed in the QT, a third parameter indicating a maximum block size of a root node allowed in the BT, and a fourth parameter indicating a size of the block of the video data;

parsing third syntax elements which specify the partitioning structure for the block of the video data from the bitstream under restrictions imposed based on the calculated parameters to derive the partitioning structure for the block of the video data, the block of the video data belonging to the low level; and decoding subblocks corresponding to leaf nodes of the partitioning structure for the block of the video data based on the bitstream, wherein some of the first syntax elements explicitly indicates some of the parameters for block partitioning, and wherein the others of the first syntax elements indicate a difference between some of the parameters for block partitioning, and wherein the deriving of the partitioning structure comprises inferring that a given subblock is not QT-split anymore when the given subblock is equal to the size indicated by the second parameter.

12. The non-transitory computer readable medium of claim 11, wherein the first syntax elements include elements for specifying:

the size of the block of the video data;

the minimum block size of the leaf node allowed in the BT;

a difference between the minimum block size of the leaf node allowed in the BT and the minimum block size of the leaf node allowed in the QT; and a difference between the maximum block size of the root node allowed in the BT and the minimum block size of the leaf node allowed in the QT.

13. The non-transitory computer readable medium of claim 11, wherein the third syntax elements include elements for indicating:

whether a block corresponding to a parent node in the QT is divided into four subblocks corresponding to four child nodes;

whether a block corresponding to a parent node in the multi-type tree is divided into two subblocks corresponding to two child nodes or into three subblocks corresponding to three child nodes; and a direction in which a block corresponding to a parent node in the multi-type tree is divided into subblocks.

* * * * *